US011691565B2

(12) United States Patent
Cordova et al.

(10) Patent No.: US 11,691,565 B2
(45) Date of Patent: Jul. 4, 2023

(54) SYSTEMS AND METHODS FOR SENSOR-BASED DETECTION, ALERTING AND MODIFICATION OF DRIVING BEHAVIORS

(71) Applicant: CAMBRIDGE MOBILE TELEMATICS INC., Cambridge, MA (US)

(72) Inventors: Brad Cordova, Cambridge, MA (US); Rafi Finegold, Sharon, MA (US); Kevin Farrell, Windham, NH (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 348 days.

(21) Appl. No.: 15/413,005

(22) Filed: Jan. 23, 2017

(65) Prior Publication Data

US 2017/0210290 A1 Jul. 27, 2017

Related U.S. Application Data

(60) Provisional application No. 62/286,218, filed on Jan. 22, 2016.

(51) Int. Cl.
*B60Q 9/00* (2006.01)
*H04W 4/02* (2018.01)

(52) U.S. Cl.
CPC .............. *B60Q 9/00* (2013.01); *H04W 4/026* (2013.01); *H04W 4/027* (2013.01)

(58) Field of Classification Search
CPC ........ B60Q 9/00; H04W 4/026; H04W 4/027; H04W 4/046

USPC ......................................................... 340/439
See application file for complete search history.

(56) References Cited

U.S. PATENT DOCUMENTS

| | | | |
|---|---|---|---|
| 7,209,886 B2 | 4/2007 | Kimmel et al. | |
| 8,117,049 B2 | 2/2012 | Berkobin et al. | |
| 8,140,358 B1 | 3/2012 | Ling et al. | |
| 8,165,916 B2 | 4/2012 | Hoffberg et al. | |
| 8,284,039 B2 | 10/2012 | Baker et al. | |
| 8,285,439 B2 | 10/2012 | Hodges et al. | |
| 8,290,480 B2 | 10/2012 | Abramson et al. | |
| 8,296,007 B2 | 10/2012 | Swaminathan et al. | |
| 8,311,858 B2 | 11/2012 | Everett et al. | |

(Continued)

FOREIGN PATENT DOCUMENTS

| | | |
|---|---|---|
| EP | 3091498 A1 | 11/2016 |
| WO | 2012097441 A1 | 7/2012 |

(Continued)

OTHER PUBLICATIONS

U.S. Appl. No. 15/149,628, "Non-Final Office Action", dated May 5, 2017, 19 pages.

(Continued)

*Primary Examiner* — Omer S Khan
(74) *Attorney, Agent, or Firm* — Kilpatrick Townsend & Stockton LLP

(57) ABSTRACT

Embodiments of the present invention utilize mobile devices to provide information on a user's behaviors during transportation. For example, a mobile device carried by a user can be used to detect and analyze driving behavior. The mobile device can further be used to provide alerts based on driving behavior and to encourage and track modification of driving behavior.

15 Claims, 18 Drawing Sheets

(56) References Cited

U.S. PATENT DOCUMENTS

| | | |
|---|---|---|
| 8,527,013 B2 | 9/2013 | Guba et al. |
| 8,595,034 B2 | 11/2013 | Bauer et al. |
| 8,750,853 B2 | 6/2014 | Abramson et al. |
| 8,862,486 B2 | 10/2014 | Cordova et al. |
| 8,954,094 B1 | 2/2015 | Mishra et al. |
| 9,055,407 B1 | 6/2015 | Howard et al. |
| 9,056,616 B1 | 6/2015 | Fields et al. |
| 9,141,995 B1 | 9/2015 | Brinkmann et al. |
| 9,800,716 B2 | 10/2017 | Abramson et al. |
| 9,892,573 B1 | 2/2018 | Hsu-Hoffman et al. |
| 9,936,358 B2 | 4/2018 | Gruteser et al. |
| 10,028,113 B2 | 7/2018 | Abramson et al. |
| 10,042,364 B1 | 8/2018 | Hayward |
| 10,154,130 B2 | 12/2018 | Abramson et al. |
| 10,429,203 B1 | 10/2019 | Brandmaier et al. |
| 10,506,091 B2 | 12/2019 | Tibbitts et al. |
| 2004/0236474 A1 | 11/2004 | Chowdhary et al. |
| 2004/0236596 A1 | 11/2004 | Chowdhary et al. |
| 2004/0252027 A1 | 12/2004 | Torkkola et al. |
| 2006/0195591 A1 | 8/2006 | Kim et al. |
| 2007/0136107 A1 | 6/2007 | Maguire et al. |
| 2008/0065427 A1 | 3/2008 | Helitzer et al. |
| 2008/0154629 A1 | 6/2008 | Breed et al. |
| 2009/0043449 A1 | 2/2009 | Matsuura et al. |
| 2009/0197619 A1 | 8/2009 | Colligan et al. |
| 2009/0216704 A1 | 8/2009 | Zheng et al. |
| 2010/0049398 A1 | 2/2010 | Bryant et al. |
| 2010/0131304 A1* | 5/2010 | Collopy ............. G06Q 30/0224 |
| | | 705/4 |
| 2010/0174576 A1 | 7/2010 | Naylor |
| 2010/0205012 A1 | 8/2010 | McClellan et al. |
| 2010/0292921 A1 | 11/2010 | Zachariah et al. |
| 2011/0112759 A1 | 5/2011 | Bast et al. |
| 2011/0125394 A1 | 5/2011 | Horstemeyer |
| 2011/0153367 A1* | 6/2011 | Amigo ................... G07C 5/008 |
| | | 705/4 |
| 2011/0251752 A1 | 10/2011 | Delarocheliere et al. |
| 2011/0275321 A1 | 11/2011 | Zhou et al. |
| 2011/0294520 A1 | 12/2011 | Zhou et al. |
| 2012/0028624 A1 | 2/2012 | Jedlicka |
| 2012/0066251 A1 | 3/2012 | Sontmakher et al. |
| 2012/0071151 A1* | 3/2012 | Abramson ............... H04L 67/12 |
| | | 455/418 |
| 2012/0072244 A1 | 3/2012 | Collins et al. |
| 2012/0150651 A1 | 6/2012 | Hoffberg et al. |
| 2012/0197669 A1 | 8/2012 | Kote et al. |
| 2012/0209634 A1 | 8/2012 | Ling et al. |
| 2012/0214463 A1 | 8/2012 | Smith et al. |
| 2012/0237908 A1 | 9/2012 | Fitzgerald et al. |
| 2012/0289217 A1 | 11/2012 | Riemer et al. |
| 2012/0296885 A1 | 11/2012 | Sontmakher et al. |
| 2012/0303392 A1 | 11/2012 | Depura et al. |
| 2012/0310587 A1 | 12/2012 | Tu et al. |
| 2012/0316913 A1 | 12/2012 | Reyes |
| 2013/0006674 A1* | 1/2013 | Bowne ................. G07C 5/0858 |
| | | 705/4 |
| 2013/0012181 A1 | 1/2013 | Jeon |
| 2013/0046562 A1 | 2/2013 | Taylor et al. |
| 2013/0091948 A1 | 4/2013 | Yamamoto |
| 2013/0173128 A1 | 7/2013 | Syed et al. |
| 2013/0184928 A1 | 7/2013 | Kerkhof et al. |
| 2013/0209968 A1 | 8/2013 | Miller et al. |
| 2013/0238241 A1 | 9/2013 | Chelotti et al. |
| 2013/0244210 A1 | 9/2013 | Nath et al. |
| 2013/0297097 A1 | 11/2013 | Fischer et al. |
| 2014/0108058 A1 | 4/2014 | Bourne et al. |
| 2014/0114889 A1 | 4/2014 | Dagum et al. |
| 2014/0149145 A1 | 5/2014 | Peng et al. |
| 2014/0162219 A1 | 6/2014 | Stankoulov |
| 2014/0180730 A1 | 6/2014 | Cordova et al. |
| 2014/0180731 A1 | 6/2014 | Cordova et al. |
| 2014/0193781 A1 | 7/2014 | Sands |
| 2014/0222253 A1 | 8/2014 | Siegel et al. |
| 2014/0272810 A1 | 9/2014 | Fields et al. |
| 2014/0272894 A1 | 9/2014 | Grimes et al. |
| 2014/0324745 A1 | 10/2014 | Leppänen et al. |
| 2014/0370919 A1* | 12/2014 | Cordova ................. G06Q 40/08 |
| | | 455/456.1 |
| 2015/0025917 A1* | 1/2015 | Stempora ............. G06K 9/0061 |
| | | 705/4 |
| 2015/0039393 A1 | 2/2015 | Jain |
| 2015/0087264 A1 | 3/2015 | Goyal |
| 2015/0091740 A1 | 4/2015 | Bai et al. |
| 2015/0156567 A1 | 6/2015 | Oliver et al. |
| 2015/0170030 A1 | 6/2015 | Maennel |
| 2015/0186714 A1 | 7/2015 | Ren et al. |
| 2015/0296334 A1 | 10/2015 | Smyrk et al. |
| 2016/0046298 A1 | 2/2016 | Deruyck et al. |
| 2016/0051167 A1 | 2/2016 | Saha et al. |
| 2016/0066155 A1 | 3/2016 | Fan et al. |
| 2016/0127486 A1 | 5/2016 | Chen et al. |
| 2016/0163217 A1 | 6/2016 | Harkness |
| 2016/0205238 A1 | 7/2016 | Abramson et al. |
| 2016/0327397 A1 | 11/2016 | Cordova et al. |
| 2016/0366547 A1 | 12/2016 | Hodges et al. |
| 2016/0379141 A1 | 12/2016 | Judge et al. |
| 2017/0039890 A1 | 2/2017 | Truong et al. |
| 2017/0142556 A1 | 5/2017 | Matus |
| 2017/0200061 A1 | 7/2017 | Julian et al. |
| 2017/0243508 A1 | 8/2017 | Cheng et al. |
| 2017/0349182 A1 | 12/2017 | Cordova et al. |
| 2018/0035382 A1 | 2/2018 | Fonseca Montero et al. |
| 2019/0018416 A1 | 1/2019 | Gassend |
| 2019/0102840 A1 | 4/2019 | Perl et al. |
| 2019/0349470 A1 | 11/2019 | Abramson et al. |

FOREIGN PATENT DOCUMENTS

| | | |
|---|---|---|
| WO | 2014105846 A2 | 7/2014 |
| WO | 2014105846 A3 | 10/2014 |

OTHER PUBLICATIONS

Beljecki, et al., "Transportation mode-based segmentation and classification of movement trajectories", International Journal of Geographical Information Science, vol. 27, Issue 2, Oct. 19, 2012, pp. 1-28.

EP16168772.8, "Extended European Search Report", dated Aug. 31, 2016, 9 pages.

Stenneth, et al., "Transportation Mode Detection using Mobile Phones and GIS Information", ACM SIGSPATIAL GIS, Nov. 1, 2011, pp. 54-63.

U.S. Appl. No. 14/139,510, "Non-Final Office Action", dated Jul. 9, 2015, 13 pages.

U.S. Appl. No. 14/139,510, "Notice of Allowance", dated Mar. 28, 2016, 10 pages.

U.S. Appl. No. 14/192,452, "Non Final Office Action", dated Apr. 25, 2014, 10 pages.

U.S. Appl. No. 14/192,452, "Notice of Allowance", dated Jun. 10, 2014, 13 pages.

PCT/US2013/077544, "International Search Report and Written Opinion", dated Aug. 5, 2014, 11 pages.

PCT/US2016/052210, "International Search Report and Written Opinion", dated Nov. 29, 2016, 9 pages.

U.S. Appl. No. 15/268,049, "Non-Final Office Action", dated Oct. 5, 2017, 13 pages.

U.S. Appl. No. 15/149,628, "Final Office Action", dated Nov. 20, 2017, 26 pages.

U.S. Appl. No. 15/268,049, "Notice of Allowance", dated Aug. 1, 2018, 9 pages.

U.S. Appl. No. 15/149,628, "Notice of Allowance", dated May 10, 2018, 12 pages.

U.S. Appl. No. 15/268,049, "Final Office Action", dated Apr. 17, 2018, 13 pages.

U.S. Appl. No. 15/615,579, "Non-Final Office Action", dated Apr. 8, 2019, 16 pages.

U.S. Appl. No. 16/177,694, "Non-Final Office Action", dated Feb. 19, 2019, 9 pages.

EP16168772.8, "Office Action", dated Jan. 30, 2019, 8 pages.

(56) References Cited

OTHER PUBLICATIONS

U.S. Appl. No. 16/177,694, "Notice of Allowance", dated Jun. 12, 2019, 9 pages.
U.S. Appl. No. 15/615,579, "Final Office Action", dated Sep. 19, 2019, 18 pages.
U.S. Appl. No. 16/598,822, "Notice of Allowance", dated Jan. 13, 2020, 11 pages.
U.S. Appl. No. 15/615,579, "Non-Final Office Action", dated Apr. 16, 2020, 19 pages.
U.S. Appl. No. 16/598,822, "Corrected Notice of Allowability", dated Apr. 17, 2020, 7 pages.
U.S. Appl. No. 16/598,822, "Corrected Notice of Allowability", dated Mar. 20, 2020, 7 pages.
EP16168772.8, "Summons to Attend Oral Proceeding", Mar. 19, 2020, 18 pages.
U.S. Appl. No. 16/054,778, "Final Office Action", dated Feb. 5, 2021, 19 pages.
U.S. Appl. No. 15/615,579, "Final Office Action", dated Oct. 29, 2020, 20 pages.
U.S. Appl. No. 16/054,778, "Non-Final Office Action", dated Oct. 2, 2020, 13 pages.
U.S. Appl. No. 15/615,579, "Notice of Allowance", dated Mar. 31, 2021, 8 pages.
U.S. Appl. No. 16/054,778, "Notice of Allowance", dated Aug. 23, 2021, 12 pages.
U.S. Appl. No. 17/989,564, "Non-Final Office Action", dated Apr. 6, 2023, 32 pages.

\* cited by examiner

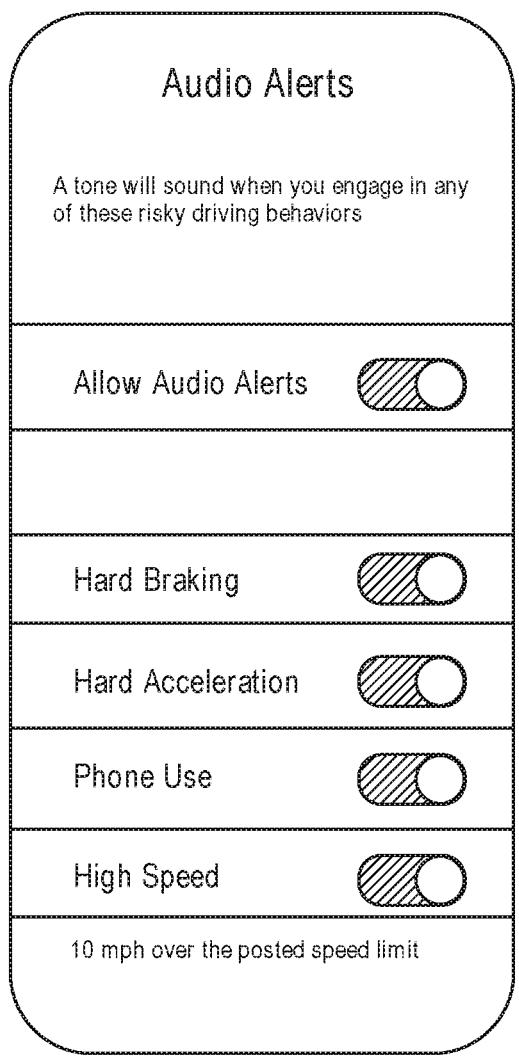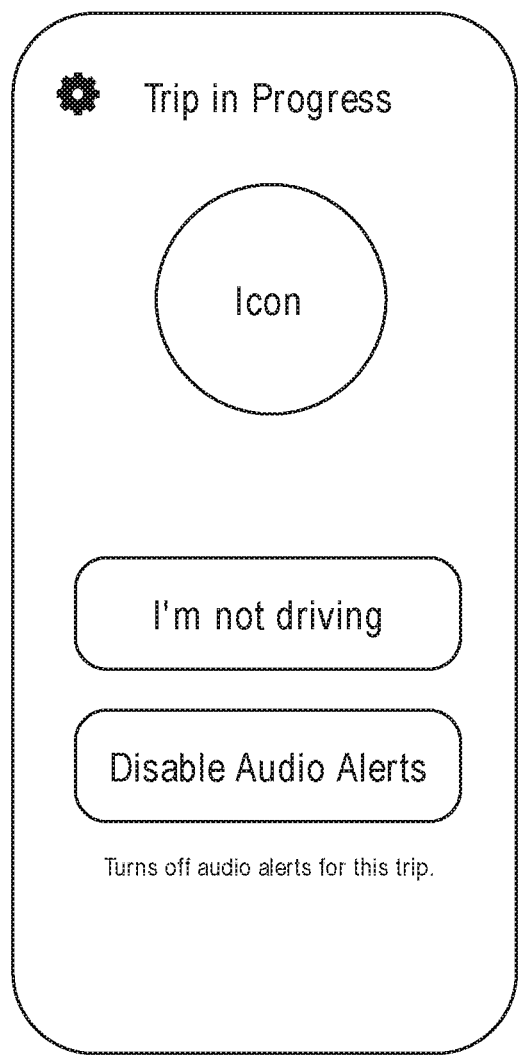
FIG. 8

PUSH AFTER TRIP WITH X BRAKES

You had 3 hard brakes on your trip on your last trip. We know you've got better.

PUSH AFTER TRIP WITH X DISTRACTION

You were interacting with your phone for over 13 minutes on your last trip. Reduce phone use to improve your score and your safety.

FIG. 9

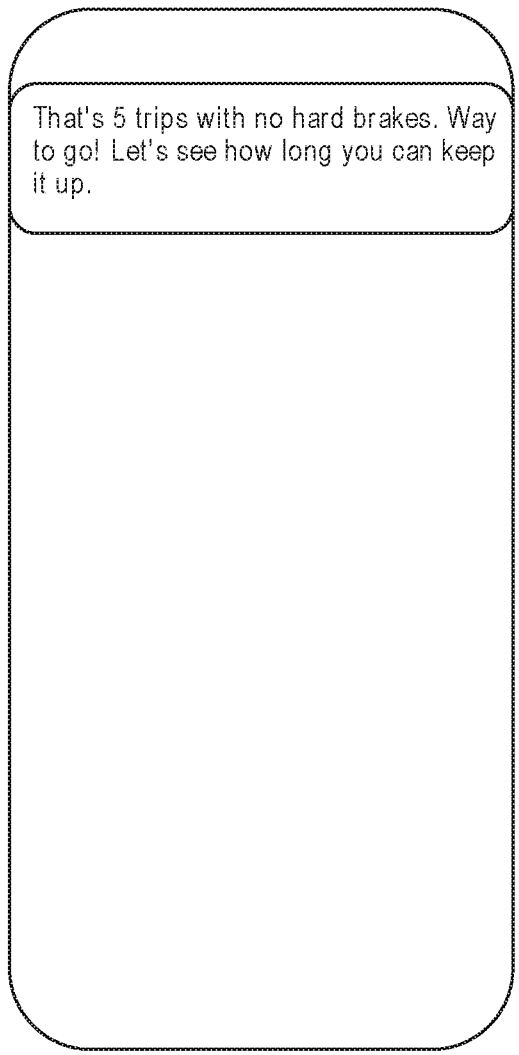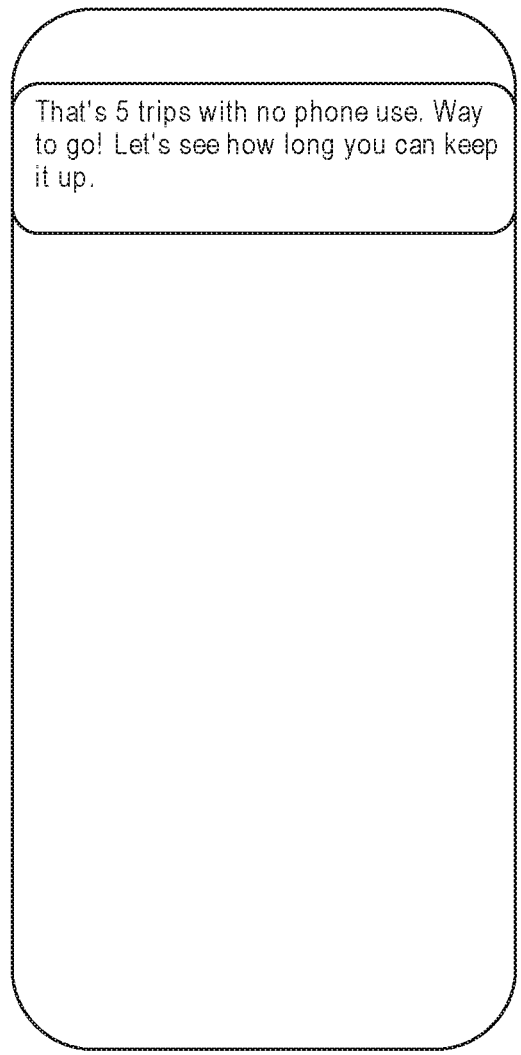
FIG. 10

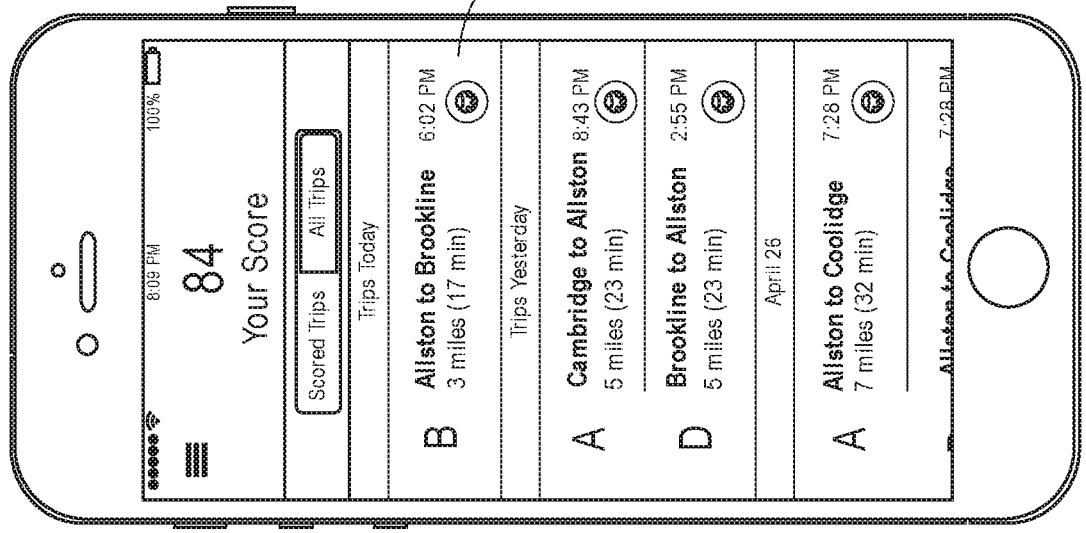
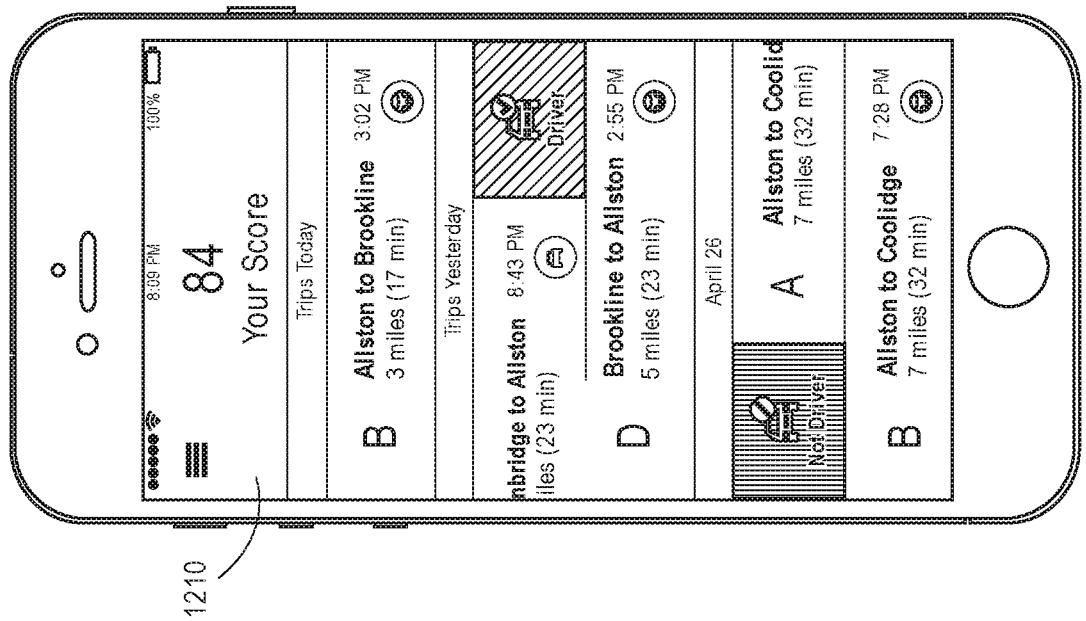
FIG. 12A

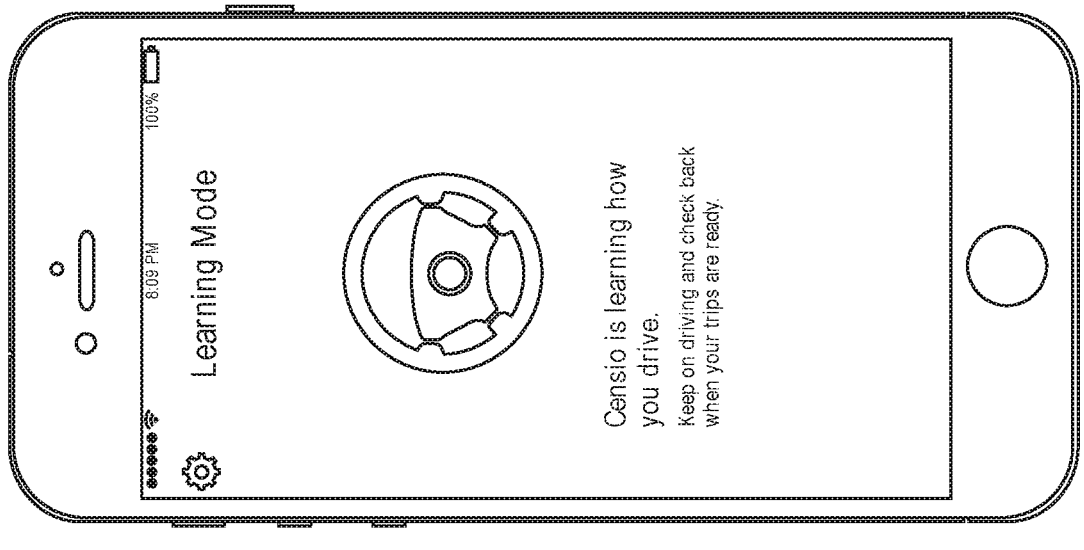
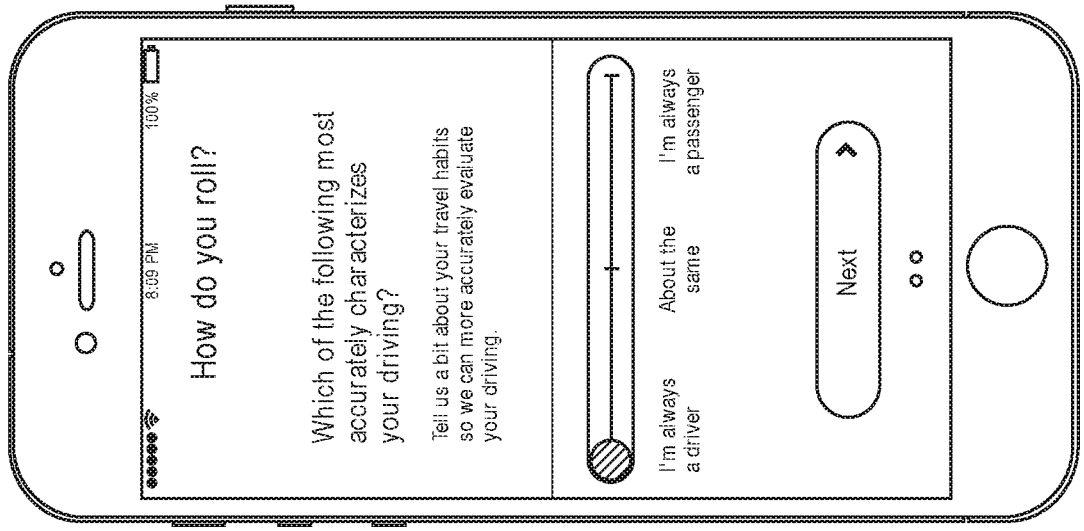
FIG. 13

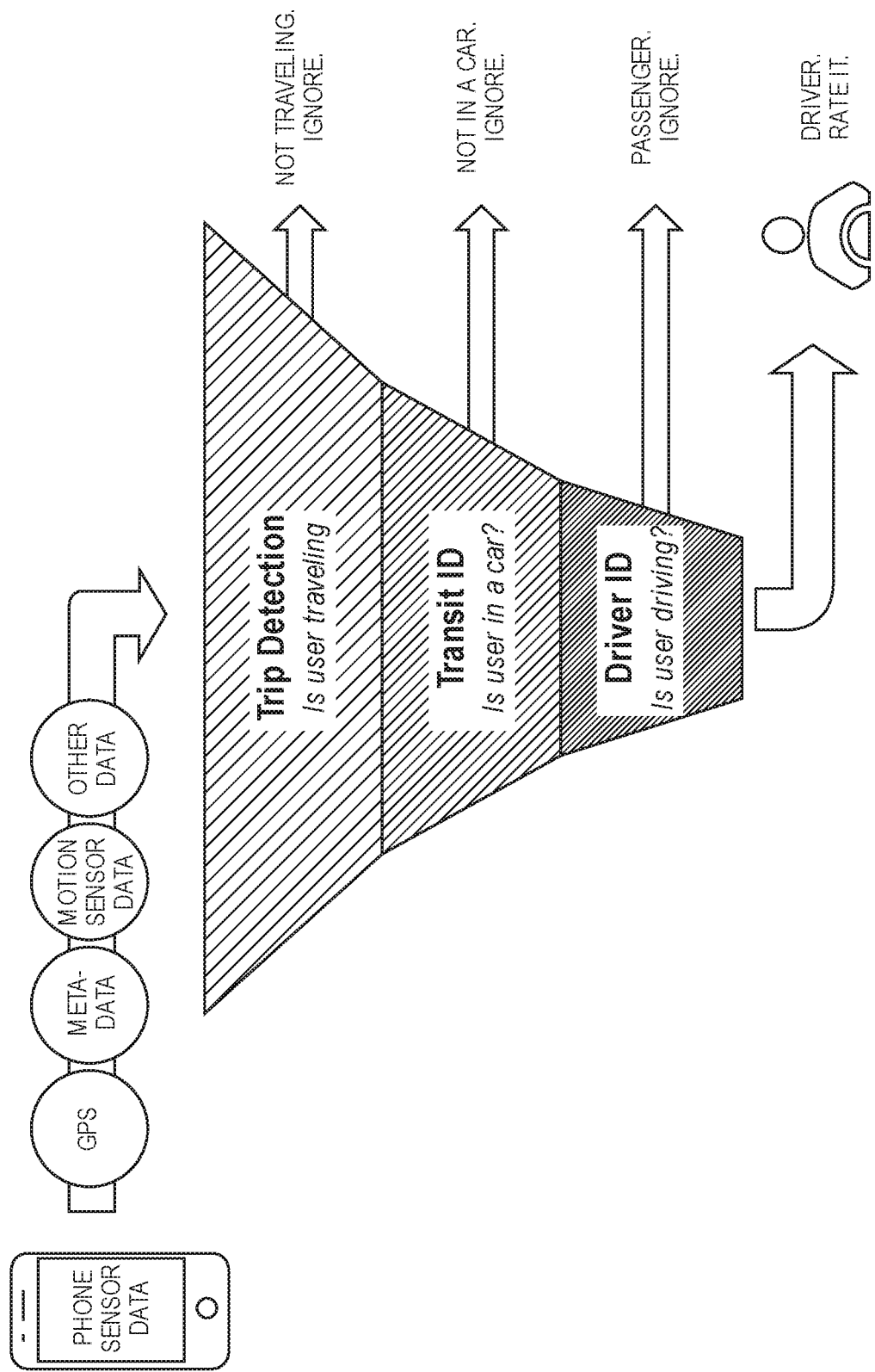

SYSTEMS AND METHODS FOR SENSOR-BASED DETECTION, ALERTING AND MODIFICATION OF DRIVING BEHAVIORS

CROSS-REFERENCES TO RELATED APPLICATIONS

This application claims the benefit of U.S. Provisional Patent Application No. 62/286,218, entitled "SYSTEMS AND METHODS FOR DETECTING AND MODIFYING DRIVING BEHAVIORS", filed Jan. 22, 2016, the content of which is hereby incorporated by reference in its entirety.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device. Some systems have been developed to track driving behaviors including speed, braking, and turn speed. Such systems include external devices that have been physically integrated with vehicles to track driving behavior.

SUMMARY OF THE INVENTION

Despite the progress made in relation to collecting data related to drivers and their driving behavior, there is a need in the art for improved systems and methods related to sensor-based detection, alerting and modification of driving behaviors.

Embodiments of the present invention utilize mobile devices to provide information on a user's behaviors during transportation. For example, a mobile device carried by a user can be used to detect and analyze driving behavior. The mobile device can further be used to alert the user of his or her driving behavior, and encourage and track modification of negative driving behavior.

By monitoring a driver's behavior, determining good versus risky driving behaviors, and presenting results as part of an accessible user experience, some embodiments provide data that can be used to influence driver behavior. As a result, safer driving behavior can be achieved. Some embodiments improve on previous systems by not only collecting information on driver behavior, but influencing the driver's behavior to achieve safer driving. Behavior modification provides a broad category in which a number of behaviors can be modified using a variety of techniques and actions.

Thus, some embodiments allow interested parties to identify and distinguish good and risky driving behaviors. Some embodiments further help drivers understand and improve their driving behavior. As a result, drivers may avoid unnecessary incidents, accidents, and even death. Financially, small impacts improving driving behavior (e.g., less distracted driving, less hard braking events, etc.) across a large population of drivers can have a major impact on society, with potential savings on the orders of billions of dollars.

According to some embodiments, a method is provided. The method comprises identifying a user of a device as a driver of a vehicle. The method further comprises correlating movement of the device to a trip in the vehicle. The method further comprises monitoring at least one behavior of the device in the vehicle. The method further comprises correlating the at least one behavior to at least one driving event. The method further comprises notifying the user of the at least one driving event using the device.

According to some embodiments, a device is provided. The device comprises a memory. The device further comprises a processor coupled to the memory. The processor is configured to perform operations including the steps of the above method.

According to some embodiments, a computer-program product is provided. The computer-program product is tangibly embodied in a non-transitory machine-readable storage medium of a device. The computer-program product includes instructions that, when executed by one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 8 illustrates screen shots of audio alert configuration for modifying driving behavior according to an embodiment of the invention.

FIG. 9 illustrates screen shots of notifications for modifying driving behavior according to an embodiment of the invention.

FIG. 10 illustrates screen shots of notifications for modifying driving behavior according to an embodiment of the invention.

FIG. 12A illustrates screen shots of determining user driver status according to an embodiment of the invention.

FIG. 13 illustrates a graph of risk and claims cost with respect to time according to an embodiment.

FIG. 15 illustrates a method of determining if a trip is insurable according to an embodiment of the present invention.

DETAILED DESCRIPTION OF SPECIFIC EMBODIMENTS

Figure 1:
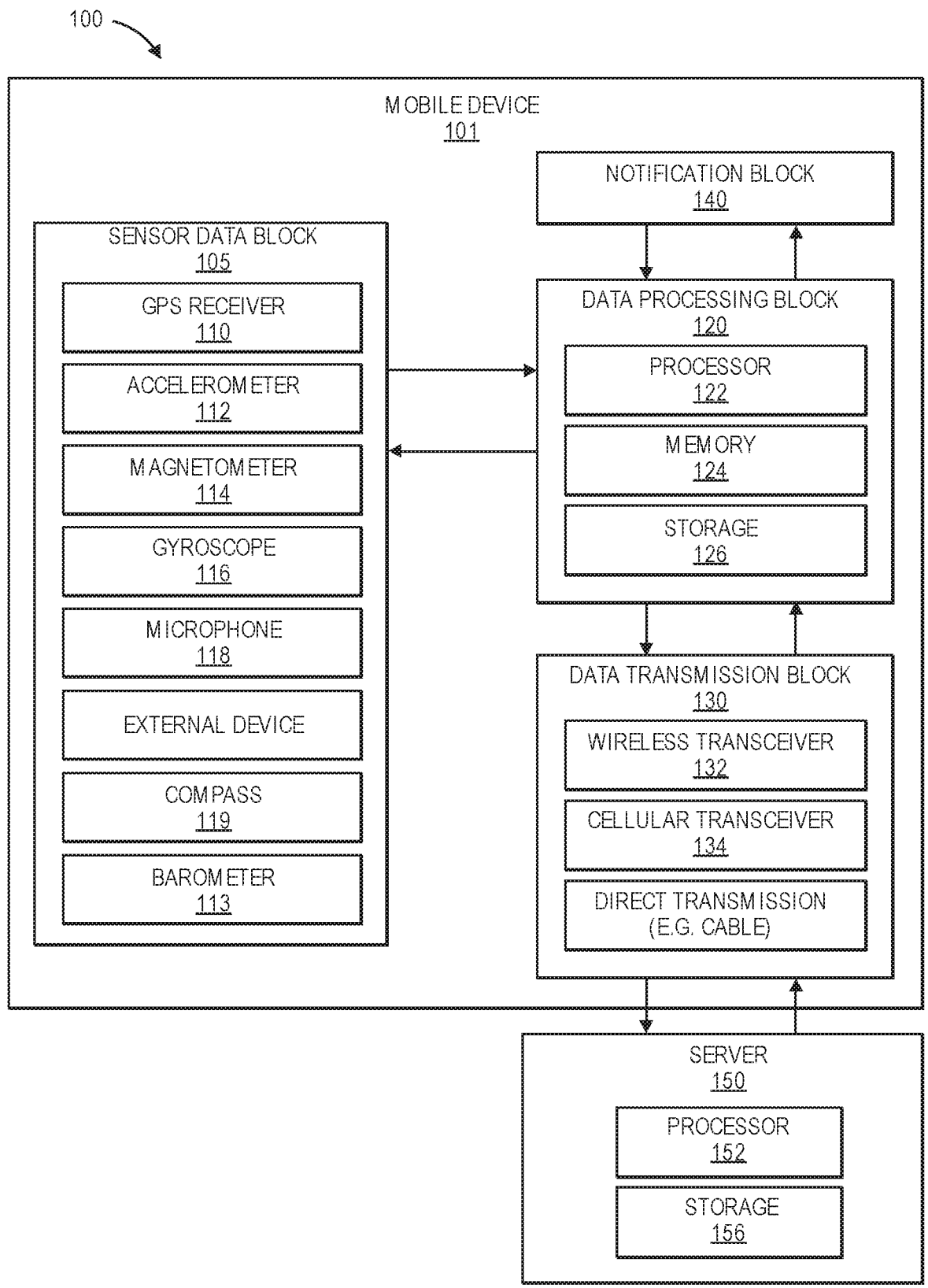
FIG. 1 is a system diagram illustrating a driving behavior detection, alert and modification system according to an embodiment of the invention.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

FIG. 1 is a system diagram illustrating a system 100 for collecting driving data according to an embodiment of the present invention. System 100 may include a mobile device 101 having a number of different components. Mobile device 101 may include a sensor data block 105, a data processing block 120, a data transmission block 130, and a notification block 140. The sensor data block 105 may include data collection sensors as well as data collected from these sensors that are available to mobile device 101. This can include external devices connected via Bluetooth, USB cable, etc. The data processing block 120 may include storage 126, and manipulations done to the data obtained from the sensor data block 105 by processor 122. This may include, but is not limited to, analyzing, characterizing, subsampling, filtering, reformatting, etc. Data transmission block 130 may include any transmission of the data off the phone to an external computing device that can also store and manipulate the data obtained from sensor data block 105, such as by using a wireless transceiver 132 a cellular transceiver 134, and/or direct transmission (e.g., through a cable or other wired connection). The external computing device can be, for example, a server 150. Server 150 can comprise its own processor 152 and storage 156. Notification block 140 may report the results of analysis of sensor data performed by the data processing block 120 to a user of the mobile device 101 via a display, a speaker, a haptic alert (e.g., a vibration), etc. (not shown). The terms "notification" and "alert" may be used interchangeably herein. The functions of notification block 140 are described further herein with respect to FIG. 3 and FIGS. 7-10. In one embodiment, mobile device 101 may further include a scoring block (not shown) to score individual drives or trips, as described further herein with respect to FIG. 3 and FIG. 12A.

Some embodiments of the present invention are described using examples where driving data is collected using a mobile device 101, and these examples are not limited to any particular mobile device. As examples, a variety of mobile devices including sensors such as GPS receivers 110, accelerometers 112, gyroscopes 116, magnetometers 114, microphones 118, compasses 119, barometers 113, location determination systems such as global positioning system (GPS) receivers 110, communications capabilities, and the like are included within the scope of some embodiments. Exemplary mobile devices include smart watches, wearable devices, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device (e.g., collected by global positioning system (GPS) sensors), and enabling background app refresh allows some embodiments to execute in the background, collecting and analyzing driving data even when the application is not executing. In some implementations, alerts (e.g., audio alerts, haptic alerts, visual alerts, etc.) are provided or surfaced using notification block 140 while the app is running in the background since the trip capture can be performed in the background.

Figure 2:
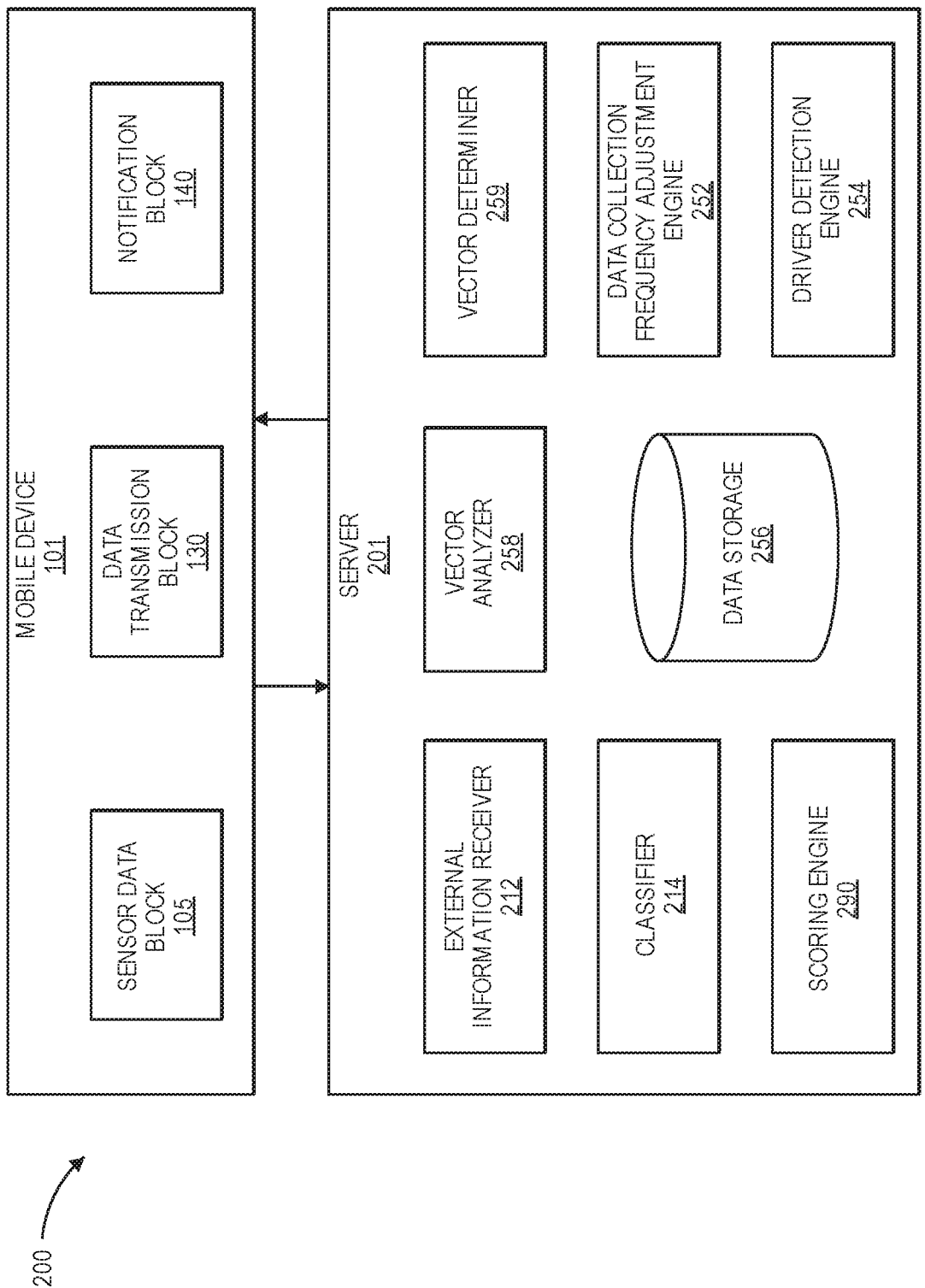
FIG. 2 is a system diagram illustrating a driving behavior detection, alert and modification system according to an embodiment of the invention.

FIG. 2 shows a system 200 for collecting driving data that can include a server 201 that communicates with mobile device 101. In some embodiments, server 201 may provide functionality using components including, but not limited to vector analyzer 258, vector determiner 259, external information receiver 212, classifier 214, data collection frequency engine 252, and driver detection engine 254. These components are executed by processors (not shown) in conjunction with memory (not shown). Server 201 may also include data storage 256. It is important to note that, while not shown, one or more of the components shown operating within server 201 can operate fully or partially within mobile device 101, and vice versa.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Exemplary processes detect and classify driving features using classifier 214, and determine acceleration vectors using vector analyzer 258 and vector determiner 259. In some embodiments, external data (e.g., weather) can be retrieved and correlated with collected driving data.

As discussed herein, some embodiments can transform collected sensor data (e.g., driving data collected using sensor data block 105) into different results, including, but not limited to, estimates of the occurrence of times where a driver was distracted. Examples of collecting driving data using sensors of a mobile device are described herein. Examples of analyzing collected driving data to detect the occurrence of driving events are also described herein. Although some embodiments are discussed in terms of distracted driving and braking events, embodiments are not limited to these particular behaviors and other driving behaviors are included within the scope of embodiments. Notifications and alerts of driving events may be made via notification block 140 of mobile device 101.

As discussed further below, some embodiments analyze collected driving data and assign scores based on different criteria. Some embodiments use scoring engine 290 to analyze relevant data and rules, and generate scores for embodiments.

Although shown and described as being contained within server 201, it is contemplated that any or all of the components of server 201 may instead be implemented within mobile device 101, and vice versa. It is further contemplated that any or all of the functionalities described herein may be performed during a drive, in real time, or after a drive.

Figure 3:
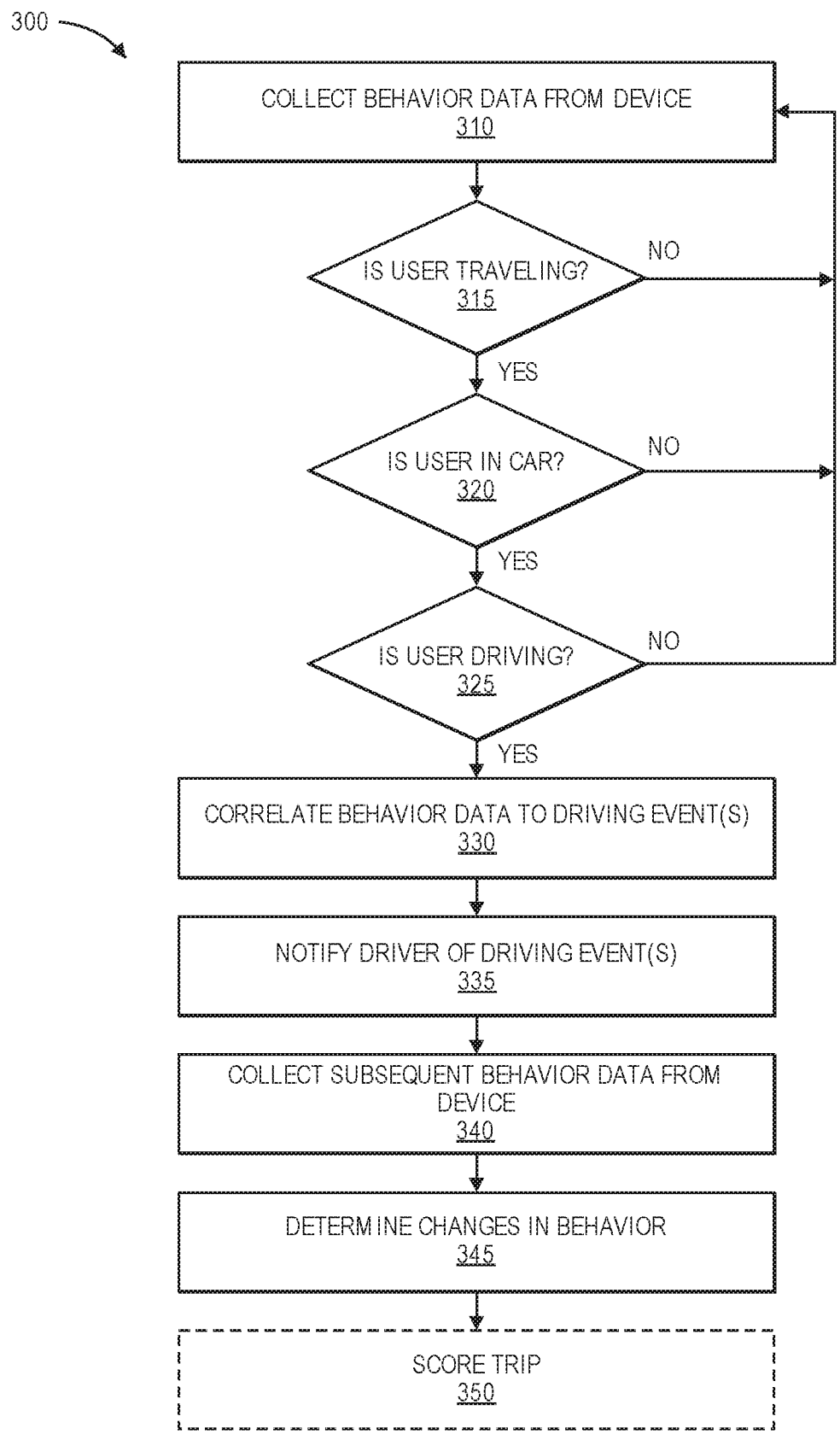
FIG. 3 is a flowchart illustrating a driving behavior detection, alert and modification method according to an embodiment of the invention.

FIG. 3 is a flowchart 300 illustrating a driving behavior detection, alert and modification method according to an embodiment of the invention. At step 310, behavior data is collected from a device. The device may be, for example, mobile device 101 of FIGS. 1 and/or 2. The behavior data may be driving data, such as that collected by one or more sensors within sensor data block 105 of FIG. 1.

At decision block 315, it is determined whether a user of the device is traveling. This may be implied, for example, by analyzing accelerometer or GPS data to determine that the device is moving in a way that is indicative of traveling, i.e., on a particular path or trajectory, at a particular speed (such as above a threshold), in a particular direction, etc. This determination is discussed further herein with respect to FIG. 4. Alternatively, the user may report that s/he is traveling. If the user is not traveling, the method returns to step 310, with behavior data continuing to be collected. If the user is traveling, the method continues at decision block 320.

At decision block 320, it is determined whether the user of the device is traveling in a car. This may be implied, for example, by analyzing accelerometer or GPS data to determine that the device is moving at a speed consistent with traveling by car, and by eliminating other possible modes of transportation, as discussed further herein. This determination is discussed further herein with respect to FIG. 5. Alternatively, the user may report that s/he is traveling in a car. If the user is not traveling in a car, the method returns to step 310, with behavior data continuing to be collected. If the user is traveling in a car, the method continues at decision block 325.

At decision block 325, it is determined whether the user of the device is driving. A variety of methods can be used to make this determination. One exemplary method is discussed further herein with respect to FIG. 6. However, it is contemplated that any of a variety of other methods may be used to determine whether the user of the device is driving. Alternatively, the user may report that s/he is driving. If the user is not driving, the method returns to step 310, with behavior data continuing to be collected. If the user of the device is driving, the method continues at step 330. In some embodiments, if it is determined that the user of the device is driving, this information may be transmitted to a server (e.g., server 150 of FIG. 1 and/or server 201 of FIG. 2) and shared with other users of other devices (e.g., displayed on the mobile devices of contacts within the user device). Thus, users of other devices may take actions based on the driving status of the user of the device, such as refraining from text messaging, calling, or otherwise enabling distracted driving behavior.

FIG. 15 illustrates a method of determining if a trip should be further analyzed as described below according to an embodiment of the present invention. As discussed above, data received from the mobile device (e.g., a phone), which can be referred to as phone sensor data or mobile device data, including, but not limited to location information (e.g., GPS data), meta-data, motion sensor data, and other data, is analyzed to determine if the use is traveling as discussed in relation to 315, if the user is utilizing public transport as discussed in relation to 320, or if the user is in a car as discussed in relation to 325. If the user is driving, then the user is identified as a driver, not a passenger, and the trip can be further analyzed and rated or scored in conjunction with the driver, as described further herein.

Turning back to FIG. 3, at step 330, the collected behavior data is correlated to one or more driving events. Driving events may include, for example, distracted driving events, hard braking events, rapid acceleration events, speeding events, cornering events, and/or the like. For example, data from an accelerometer indicating rapid deceleration may be correlated to a hard braking event. In another example, data from an accelerometer indicating a high rate of acceleration may be correlated to a speeding event. In still another example, data from an accelerometer indicating movement or manipulation of the device by the user within the vehicle during a drive may be correlated to a distracted driving event. Detection and assessment of distracted driving events is described further in U.S. patent application Ser. No. 15/268,049, filed Sep. 16, 2016, entitled "SYSTEMS AND METHODS FOR DETECTING AND ASSESSING DISTRACTED DRIVERS", herein incorporated by reference in its entirety. The driving events may also indicate positive driving behavior, such as a lack of hard braking events, a lack of speeding events, and/or a lack of distracted driving events. Some embodiments combine data from several sources, for example, driver identification, vehicle dynamics, and the driver's interaction with the mobile device, for instance, touching the screen of the device or moving the device, while going through a corner or speeding. Cross-correlation between the classification of drivers and driving behavior and the driver's actions while driving provide benefits not available with conventional techniques. As an example, assume a person is texting for a total time of 5 seconds during a trip (e.g., because 5 seconds is the average eyes-off-road time when texting, according to a Virginia Tech Transportation Institute study, 2009). The average speed of the trip can be determined, and an alert can be delivered to let the driver better understand that his or her risky behavior effectively had his or her eyes closed for a predetermined portion (e.g., 5 seconds of eyes-off-road time at 55 mph would cover the length of a football field) of the trip. By using a mobile device to classify and correlate behaviors, the driver's behavior that cannot be determined using an external device mounted in the vehicle are available and useful. For instance, if the driver is touching the screen during driving, this can be ascertained by embodiments of the present invention whereas this data is not available using only an external, mounted device. Since the mobile device (e.g., the smartphone) is used as a trip capture device by embodiments of the present invention, device handling and use during the trip can be correlated with vehicle information in new ways as compared to conventional techniques.

At step 335, the driver may be notified through the device of the one or more driving events using one or more notifications. The notification can be in real time, shortly after the driving event occurs, or after the drive is over. As an example of a real time alert, an alert may be pushed to the mobile device as soon as the mobile device is handled by the driver, or after the mobile device has been handled by the driver for a certain duration. The notification can come in the form of, for example, an audio alert, a haptic alert, a visual alert, a push notification, in-application feedback, and/or the like. In some embodiments, the alerts may be customizable. For example, an audio alert may be provided in the voice of a family member to provide greater impact to the driver. In another example, the haptic alert may be customized to vibrate at a particular frequency, duration, pattern, strength, etc., such that the haptic alert of driver behavior may not be confused with another alert (e.g., a text message, phone call, etc.), which may vibrate in a different manner.

Figure 7:
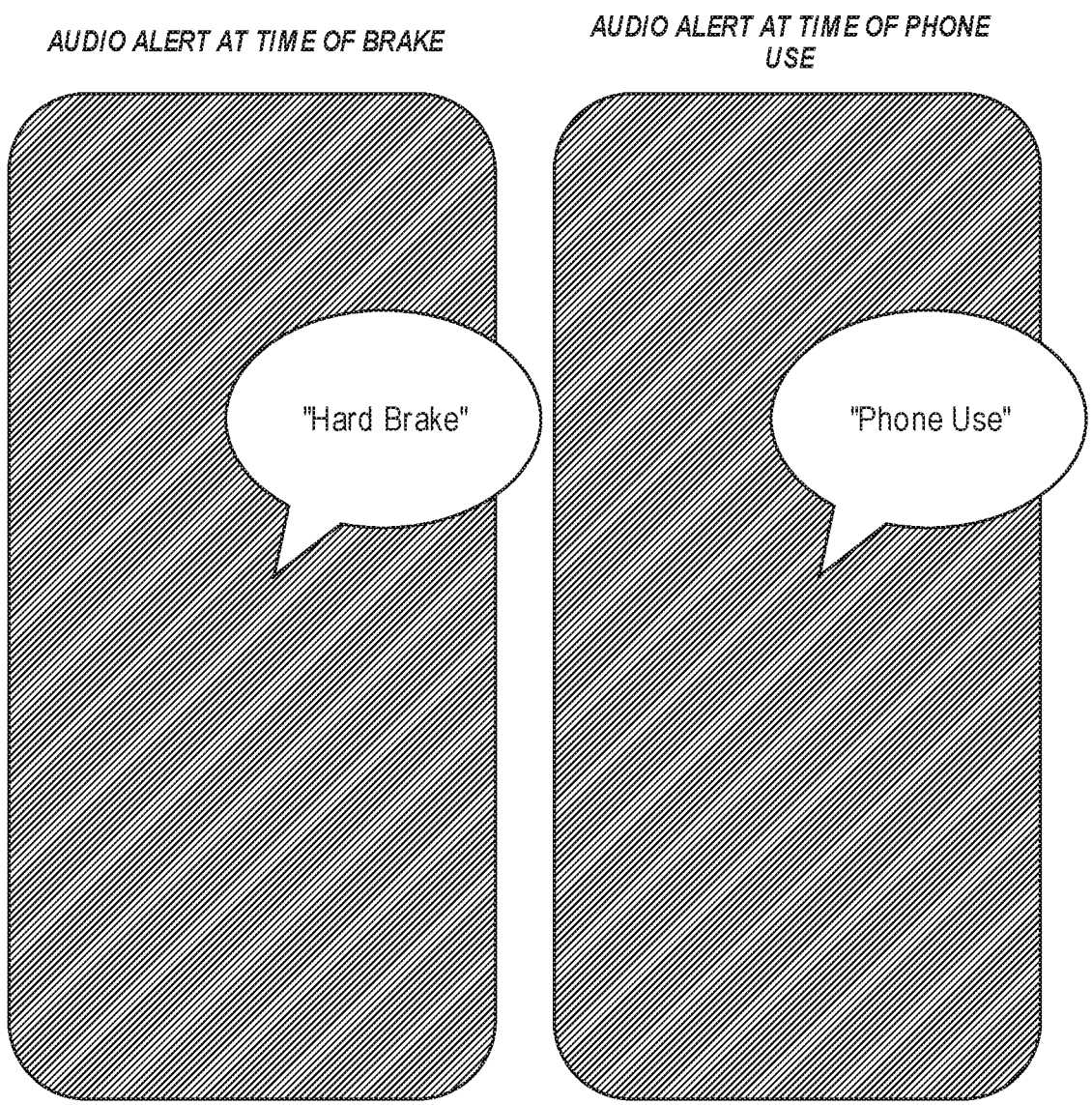
FIG. 7 illustrates screen shots of audio alerts for modifying driving behavior according to an embodiment of the invention.

Exemplary audio alerts for a "hard brake" and "phone use" while driving are illustrated in FIG. 7. The audio alerts may be enabled, disabled, and configured, as shown in FIG. 8. Audio alerts can take many forms, including GPS information, voice commands, the tone in which the message is delivered, the voice in which the message is delivered, and the like. Embodiments of the present invention enable A/B testing of various notification strategies, for example, notification during the trip versus push notification after the completion of the trip. The effectiveness of the educational messages can be measured by the results measured during subsequent drives by the user. Alerts can be tested, with the most effective alerts (e.g., for a given user) delivered to the user in a very user-centric manner. The effectiveness of the messages (e.g., hard braking summary after the trip versus real-time alert through the mobile device) may be measured and vary depending on the particular driving behavior that is being addressed. The A/B testing can be performed pre-production as well as ongoing in production in an on-going, continual manner, including cycles of identifying the driver, classifying behaviors, notifying the driver, measuring effectiveness and methods, and looping back to driver identification.

Push notifications can provide negative and/or positive feedback regarding the one or more driving events. Exemplary push notifications providing negative feedback for "hard brakes" and "phone use" while driving are illustrated in FIG. 9. Exemplary push notifications providing positive feedback for "no hard brakes" and "no phone use" while driving are illustrated in FIG. 10. In some embodiments, feedback is given immediately (i.e., in real time), whereas in other embodiments, the feedback is delayed until later in the drive, after the drive, on a periodic basis, after a certain duration of observed behavior (e.g., 30 total seconds of mobile device usage, 5 hard brakes, etc.) or the like. The processing mode in which the system operates, for example, post-processing after the drive, real-time processing during the drive, or the like can be varied depending on circumstances. As an example, if the mobile device is stationary, data can be collected and stored for later processing. However, if the mobile device is picked up, processing could shift to real-time processing either in the cloud, on the server, on the mobile device, a combination thereof, or the like. In one approach, data is sent from the mobile device to a server at the end of the trip and then processed by the server. After processing, the notifications and/or alerts may be sent to the mobile device for display or presentation to the user. In other approaches, some of the processing of the data is performed on the mobile device and notifications are surfaced to the user in real-time. In these implementations, some of the processing can be performed off the mobile device and results sent back as appropriate. In some embodiments, one or more alerts and/or notifications may be temporarily or permanently dismissed or turned off by shaking the mobile device. One of ordinary skill in the art would recognize many variations, modifications, and alternatives.

Turning back to FIG. 3, after the user is notified, subsequent behavior data may be collected from the device at step 340. At step 345, changes in behavior are determined using, in one example, A/B testing. For example, if an audio alert for a "hard brake" was provided at step 335, subsequent acceleration data can be collected and analyzed to determine whether any hard braking occurred after the notification. The results of this analysis may be used to determine the efficacy of the notification in modifying or improving the user's driving behavior. The type and timing of future notifications to the user can be modified based on the efficacy of previous notifications.

Figure 14:
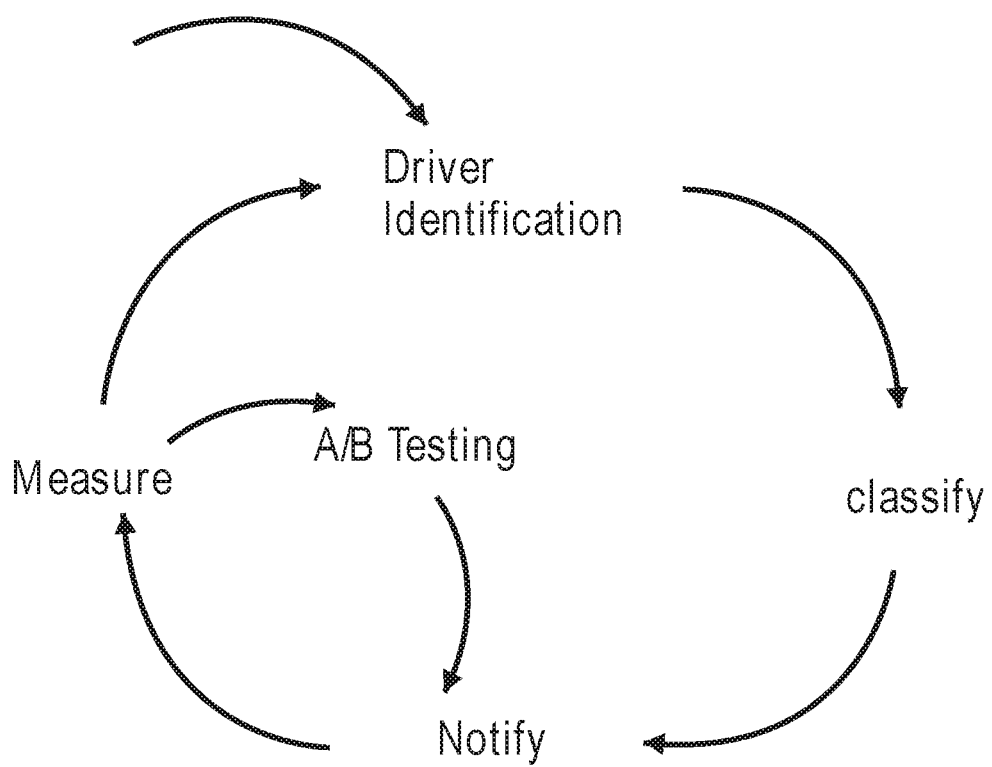
FIG. 14 illustrates a process that can be utilized according to an embodiment of the present invention to modify behavior.

FIG. 14 illustrates a process that can be utilized according to an embodiment of the present invention to modify behavior. Driver identification is performed using various methods described herein and in applications incorporated by reference. The driving behavior is classified, including driver risk, and the driver can be notified as described herein, either to educate or simply bring to the user's attention using multiple different methods and channels. Based on the notification, new behaviors and the impact on behavior (either positive, negative, or neutral) can be measured and A/B testing can be implemented in a loop of notifications and measurements of behavior in response to the notifications. Multiple methods of notification and impact can be measured using A/B testing on different target/user groups, for example, to identify the most effective methods of improving behavior, for the given risk. At a high level, the process can be repeated for subsequent driving events as the driver identification process is repeated for each driving event.

Figure 11:
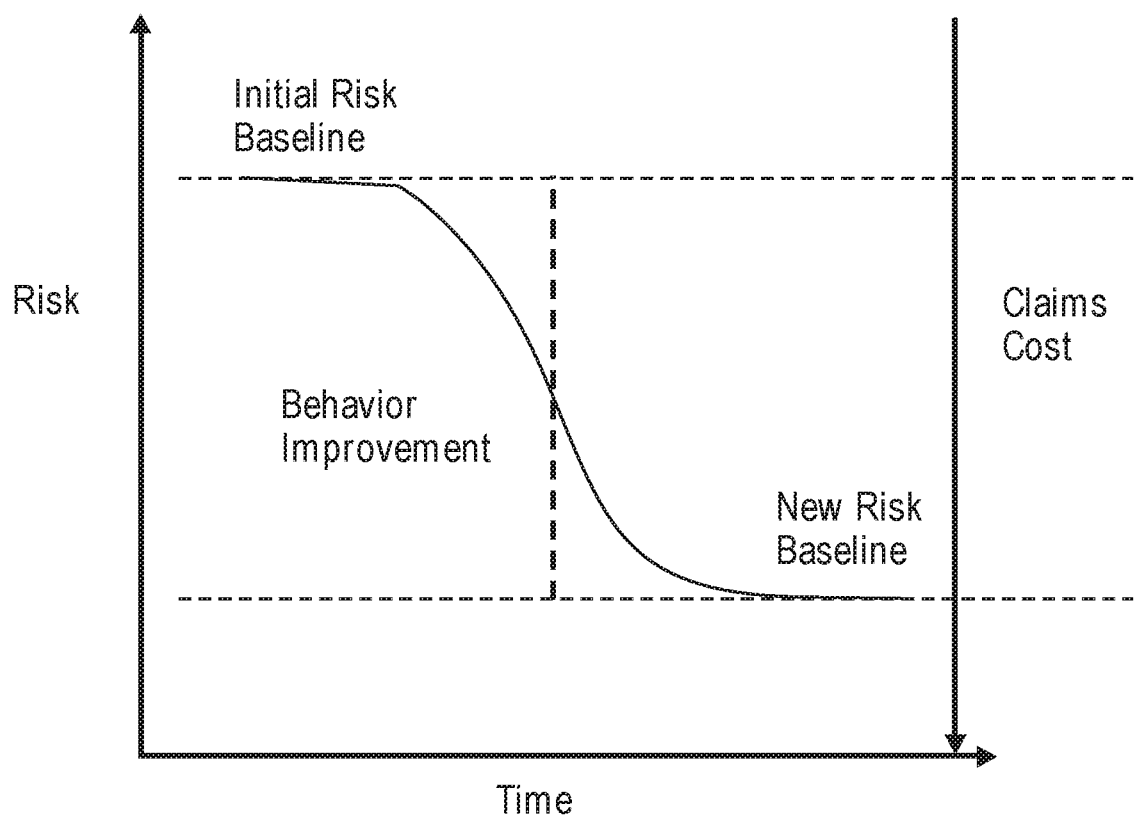
FIG. 11 illustrates screen shots of trip scoring for modifying driving behavior according to an embodiment of the invention.

FIG. 11 illustrates a graph of risk and claims cost with respect to time according to an embodiment, after a notification is made. As shown, behavior improvement as a result of notification can significantly reduce risk and insurance claims costs over time.

Turning back to FIG. 3, optional step 350, the drive can be scored based on the driving events, as well as on overall driving behavior, and can be displayed to the user in one embodiment. This score may be used to educate the driver on what good and risky driving behavior is and how s/he compares to other drivers. For example, a low score may be given for a driver who has 15 hard brakes in 100 miles, while the national average is 10 hard brakes or less per 100 miles. FIG. 12A illustrates screen shots of the scores associated with five trips or drives. As an example, the first trip was at 6:02 PM from Allston to Brookline and was scored as a "B" score. As shown in FIG. 12A, the user can select or confirm on the summary screen 1210 whether or not s/he was the driver during particular drives in one embodiment. For example, for the Cambridge to Allston trip, the user has confirmed that s/he was the driver. For this trip, the score does not appear, as it has been pushed off the screen for the user to confirm that s/he was the driver. In another example, for the Allston to Coolidge trip, the user has indicated that s/he was not the driver. Thus, this trip will be removed from the summary screen 1210, and the trip's individual score will not be used to calculate the overall driver score of 84 in this example.

Scored trips screen 1220 summarizes all scored trips. Additional details related to each scored trip can be obtained by selecting a trip, which may result in the display of a trip-specific screen showing data about the trip, including the number of hard brakes, percentage of the trip in which the user interacted with the mobile device, percentage of the trip in which the user was speeding, and the like.

Figure 12B:
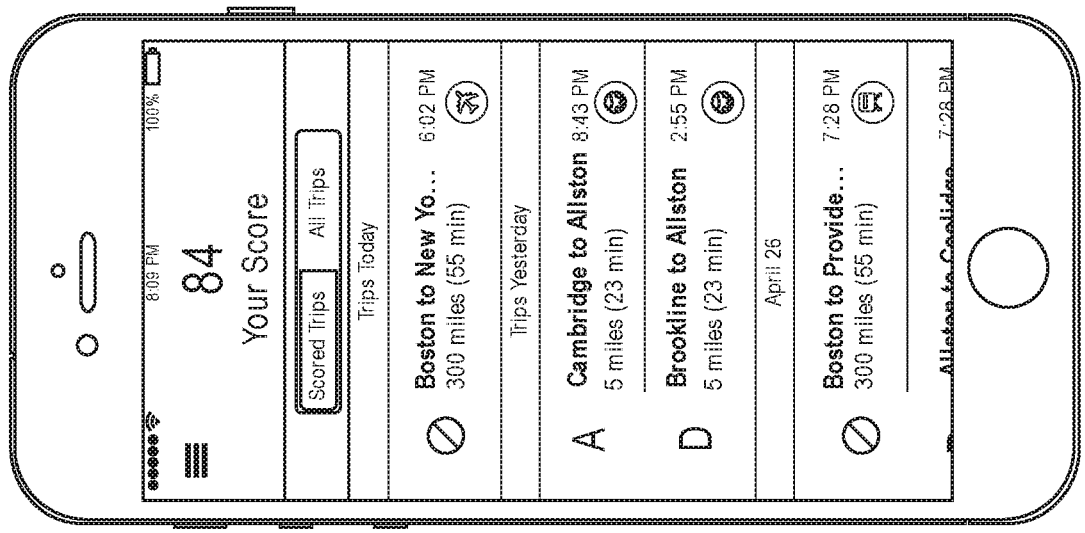
FIG. 12B illustrates a screen shot of the All Trips tab according to an embodiment of the present invention.

The scoring process can include capturing the trips, determining which trips in which the user was the driver, scoring those trips, computing user behavior based on scores, and providing feedback to modify driver behavior and improving driver performance. In some embodiments, whether or not a trip is scored can be determined using driver identification to identify the driver and identification of the mode of transportation. FIG. 12B illustrates a screen shot of all trips, both scored and unscored. For example, FIG. 12B illustrates a flight from Boston to New York, a drive from Cambridge to Allston, a drive from Brookline to Allston, and a train ride from Boston to Providence. The drives from Cambridge to Allston and from Brookline to Allston have been scored, while the flight and train ride have not been scored. The different modes of transportation taken by the user may be determined as discussed further herein.

The scored trips can be considered as trips that the driver undertook while driving, which are indicative of the driver's behavior. Unscored trips, in a similar manner, are trips during which the user was a passenger, which, therefore, do not provide data on the driver's behavior. As an example, all trips could be determined and the trips in which the user was the driver can be scored, while the trips during which the user was not driving can be unscored. As shown in FIG. 13, the user can report his or her typical driving status (i.e., typically a driver, typically a passenger, or a combination) to help identify scorable trips. In some cases, if the certainty of the decision of driving/nondriving trips falls below a threshold, for example, if the trip appears to be a driving trip in comparison with a bus, but it is not clear if the user was driving, then the trip may not be scored. Thus, the score can be only based on driver trips in some embodiments. Further disclosure regarding the scoring of driving trips can be found in U.S. Provisional Patent Application No. 62/346,013, filed Jun. 6, 2016, entitled "SYSTEMS AND METHODS FOR SCORING DRIVING TRIPS", herein incorporated by reference in its entirety. The other applications incorporated by reference can be useful in determining if a trip is insurable, including trip capture, driver identification, modes of transportation, and the like.

In one embodiment, the driving events may be collected by, or reported to, a central server (such as server 150 of FIG. 1, and/or server 201 of FIG. 2). The central server may use the driving event data, for example, to determine risky driving behavior. The central server may additionally or alternatively use the driving event data to determine the efficacy of notifications in modifying the behavior of particular target or user groups. In some embodiments, high scores and/or indicators of safe driving behavior may be tracked (e.g., on a leaderboard) and/or rewarded (e.g., with tangible and/or intangible rewards). In some embodiments, driving behavior data, driving events, and/or driving scores may be shared with a central server (e.g., server 150 of FIG. 1 and/or server 201 of FIG. 2), either with identifying information or anonymized, in order to analyze the driving behavior of individual drivers and/or to aggregate data of multiple drivers to draw conclusions.

Figure 4:
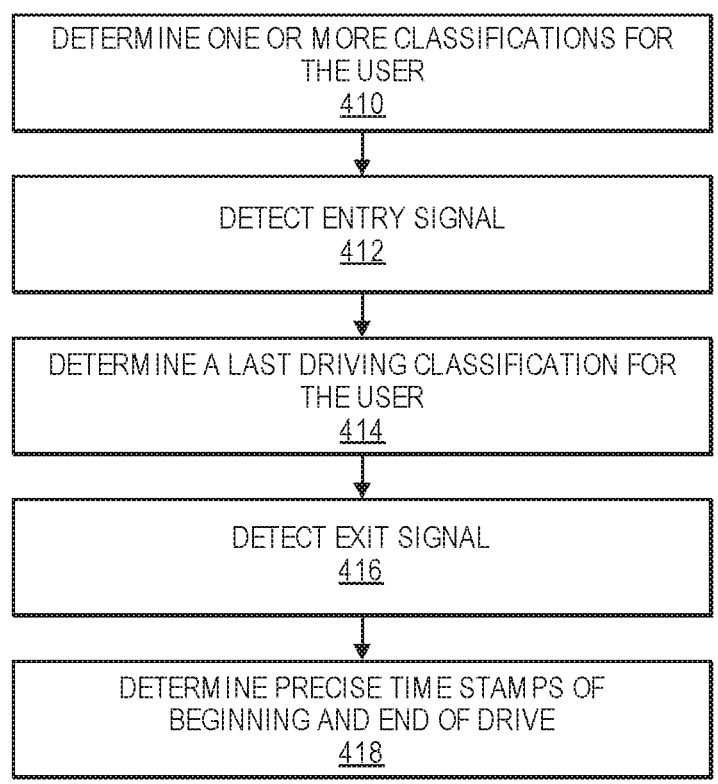
FIG. 4 is a flowchart illustrating a method of determining times during which a user is traveling according to an embodiment of the invention.

FIG. 4 is a flowchart illustrating a method of determining times during which a user is traveling in a vehicle according to an embodiment of the invention. The method includes determining one or more classifications for the user at step 410. These classifications include walking, driving, stationary, and other, and may be determined by using an accelerometer in the user's device and classifying the rate of movement of the user's device. At step 412, an entry signal is detected which corresponds to the last walking classification before the driving state is found. At step 414, a last driving classification for the user is determined before a walking classification is found again. At step 416, an exit signal is detected corresponding to the first walking classification after the driving event. At step 418, the precise time stamps of the beginning and end of a drive can be determined. Data during this window can be collected and analyzed in real-time, or after the drive. This method is described further in U.S. patent application Ser. No. 14/139,510, filed Dec. 23, 2013, now U.S. Pat. No. 9,398,423, issued on Jul. 19, 2016, entitled "METHODS AND SYSTEMS FOR DRIVER IDENTIFICATION", herein incorporated by reference in its entirety.

Figure 16A:
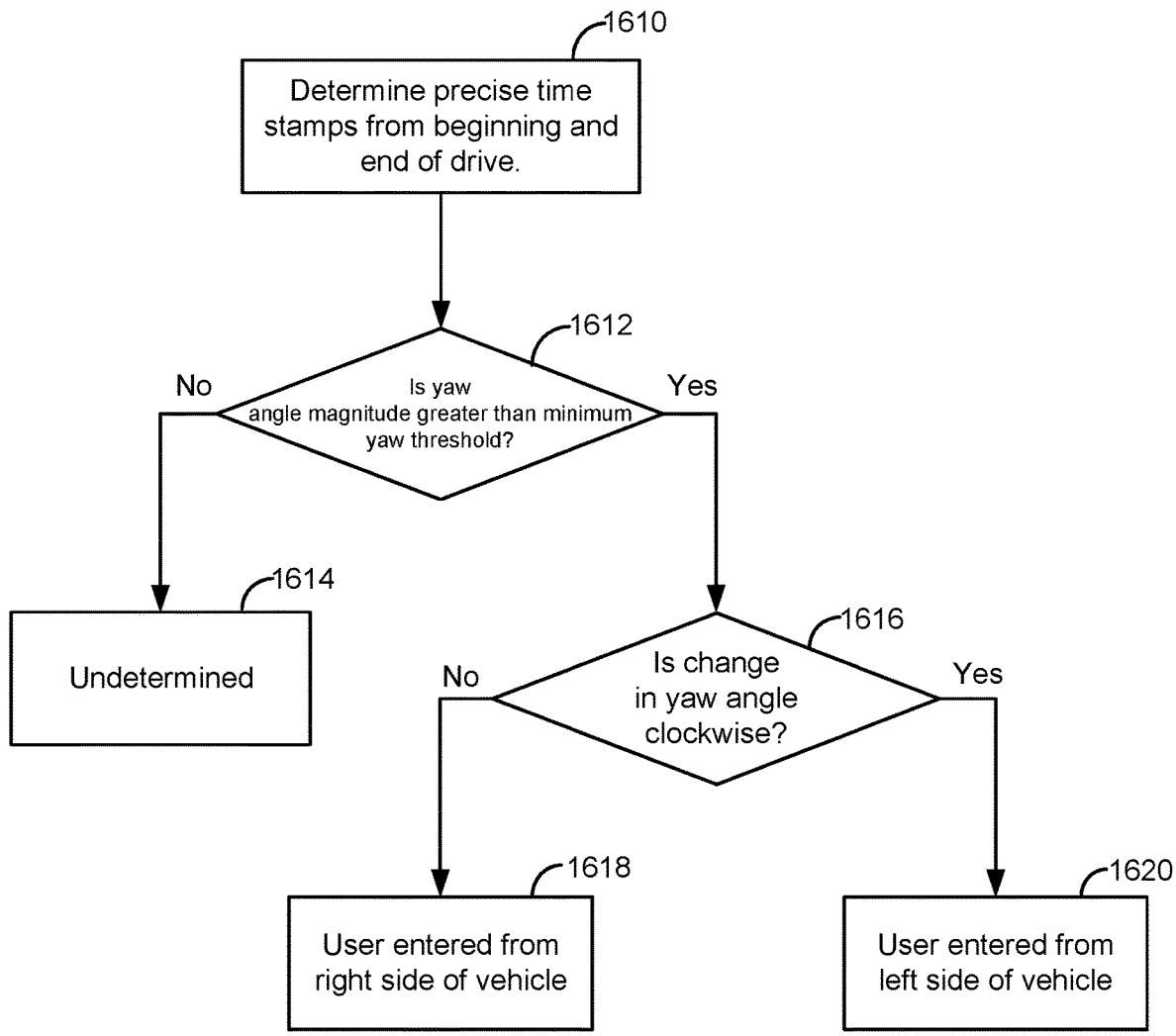
FIG. 16A is a simplified flowchart illustrating a method of determining if a user entered from the left or right side of a vehicle according to an embodiment of the present invention

FIG. 16A is a simplified flowchart illustrating a method of determining if a user entered from the left or right side of a vehicle according to an embodiment of the present invention. The method illustrated in FIG. 16A utilizes yaw detection as described below. In particular, the yaw angle of the phone is used as a unique identifier to determine if the user entered the car on the left or right side of the car. Using a reference frame in which the z-axis of the phone is oriented directly opposite of the acceleration due to the earth's gravity, the angle of rotation around the z-axis is analyzed as yaw. First determining the enter window, which represents the time span of the physical event of a user entering a car, the data over the entry window is partitioned into possibly overlapping sub-windows (1610). The length of the sub-windows starts at a relatively large size (e.g., 1 second in length) whereby the yaw data contained within each window is analyzed to detect a yaw value that is greater than a predetermined threshold over a predetermined time (1620). The algorithms used to detect this yaw value may include Dynamic Time Warping, to detect signal patterns that are invariant of time and speed, peak detection algorithms (e.g. wavelet, FFT, calculus optimization), and simple statistical thresholds.

Once this yaw value, corresponding to the user entering the car is detected, the change in yaw over this period is analyzed (1616). If the user enters the car from the passenger's side (1618), there is a unique counter clockwise rotation in this yaw axis due to the nature of the movement involved in entering the car. There will be a similar motion on the driver's side of the car on entry (and exit) (1620), but with a reversed sign to that of the passenger's side. A user typically turns at least 45 degrees when entering the car, so if a yaw angle change of approximately this magnitude is detected in the precise, then it is possible to tell on which side of the vehicle a user entered.

Figure 16B:
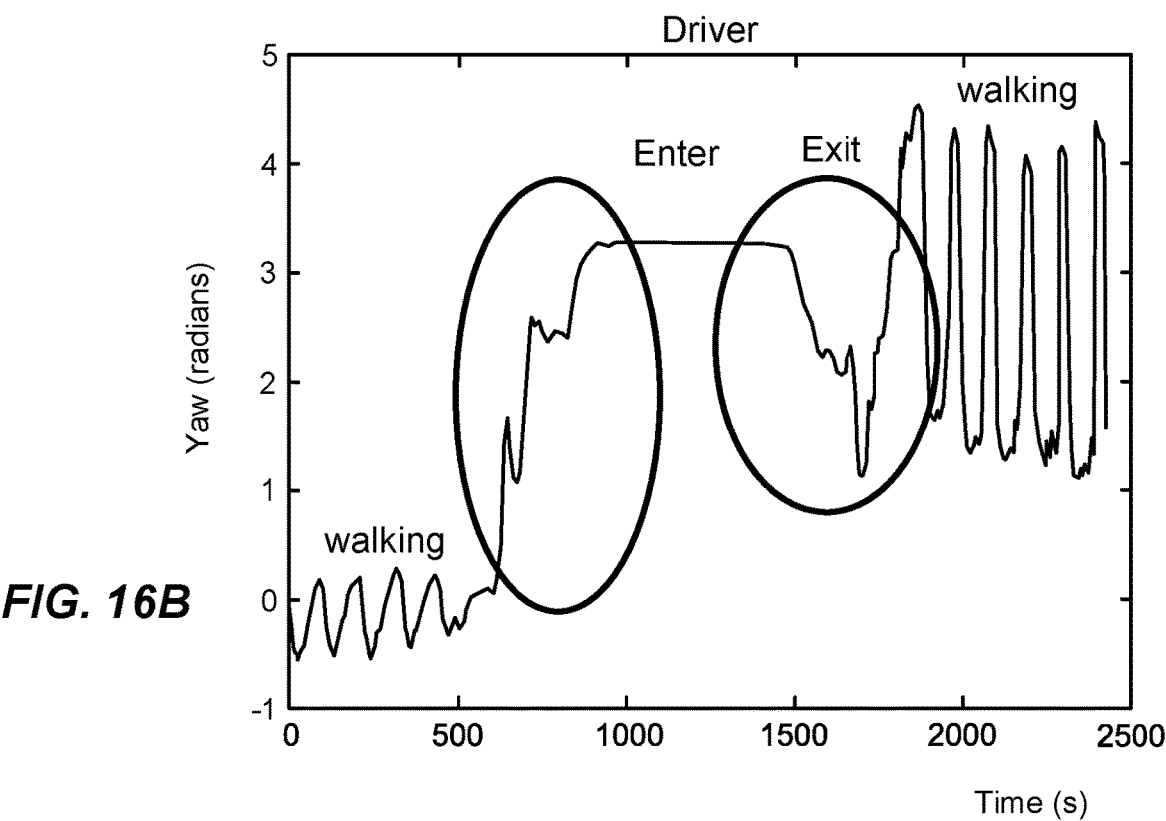
FIG. 16B is a simplified plot of yaw data as a function of time for a driver entering a vehicle according to an embodiment of the present invention.
Figure 16C:
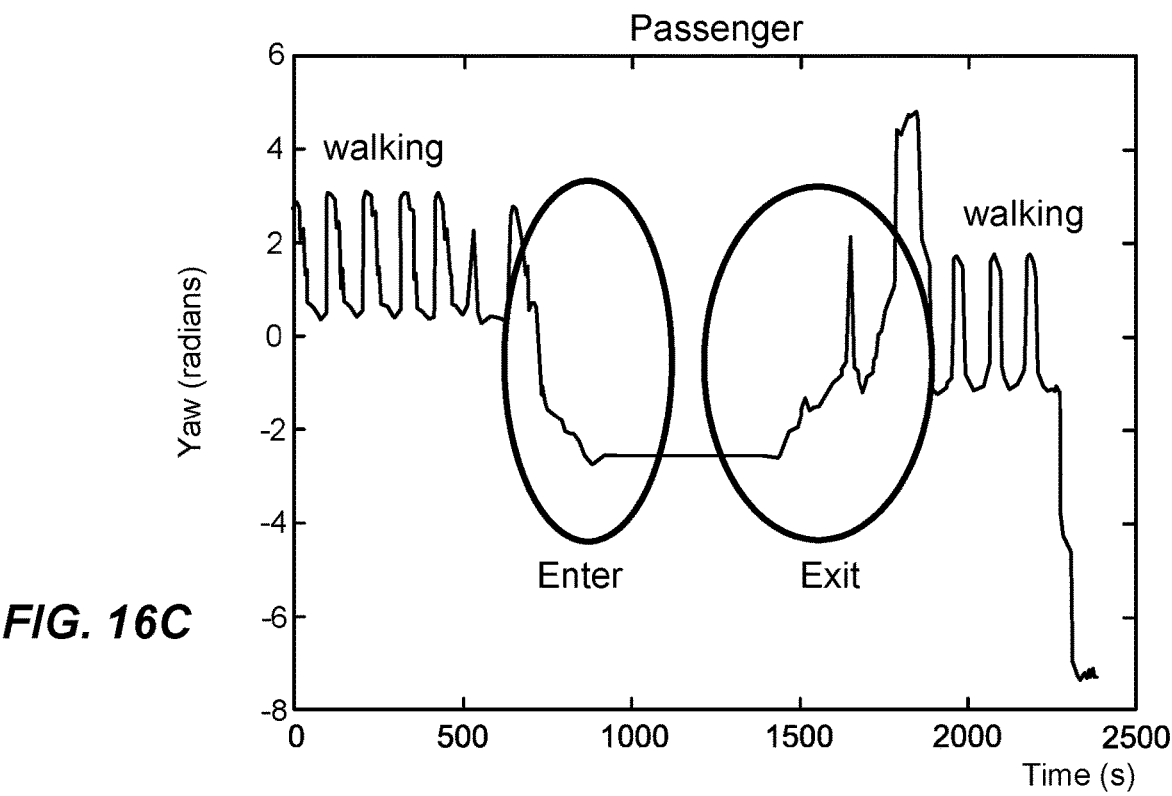
FIG. 16C is a simplified plot of yaw data as a function of time for a passenger entering a vehicle according to an embodiment of the present invention.

FIG. 16B is a simplified plot of yaw data as a function of time for a driver entering a vehicle according to an embodiment of the present invention. FIG. 16C is a simplified plot of yaw data as a function of time for a passenger entering a vehicle according to an embodiment of the present invention. As illustrated in FIG. 16B, after the transition from the walking event, the yaw angle increases during entry, stabilizes during driving, and decreases on exit. In contrast, as illustrated in FIG. 16C, for a passenger, the yaw angle decreases during entry, stabilizes during driving, and increases on exit. Therefore, by measuring the yaw angle in a reference frame oriented opposite to that of gravity and detecting the unique down-up-down pattern for the driver and the unique up-down-up pattern for the passenger, it is possible to determine if the user entered the vehicle from the left or right side of the vehicle.

It should be appreciated that the specific steps illustrated in FIG. 16A provide a particular method of determining if a user entered from the left or right side of a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 16A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
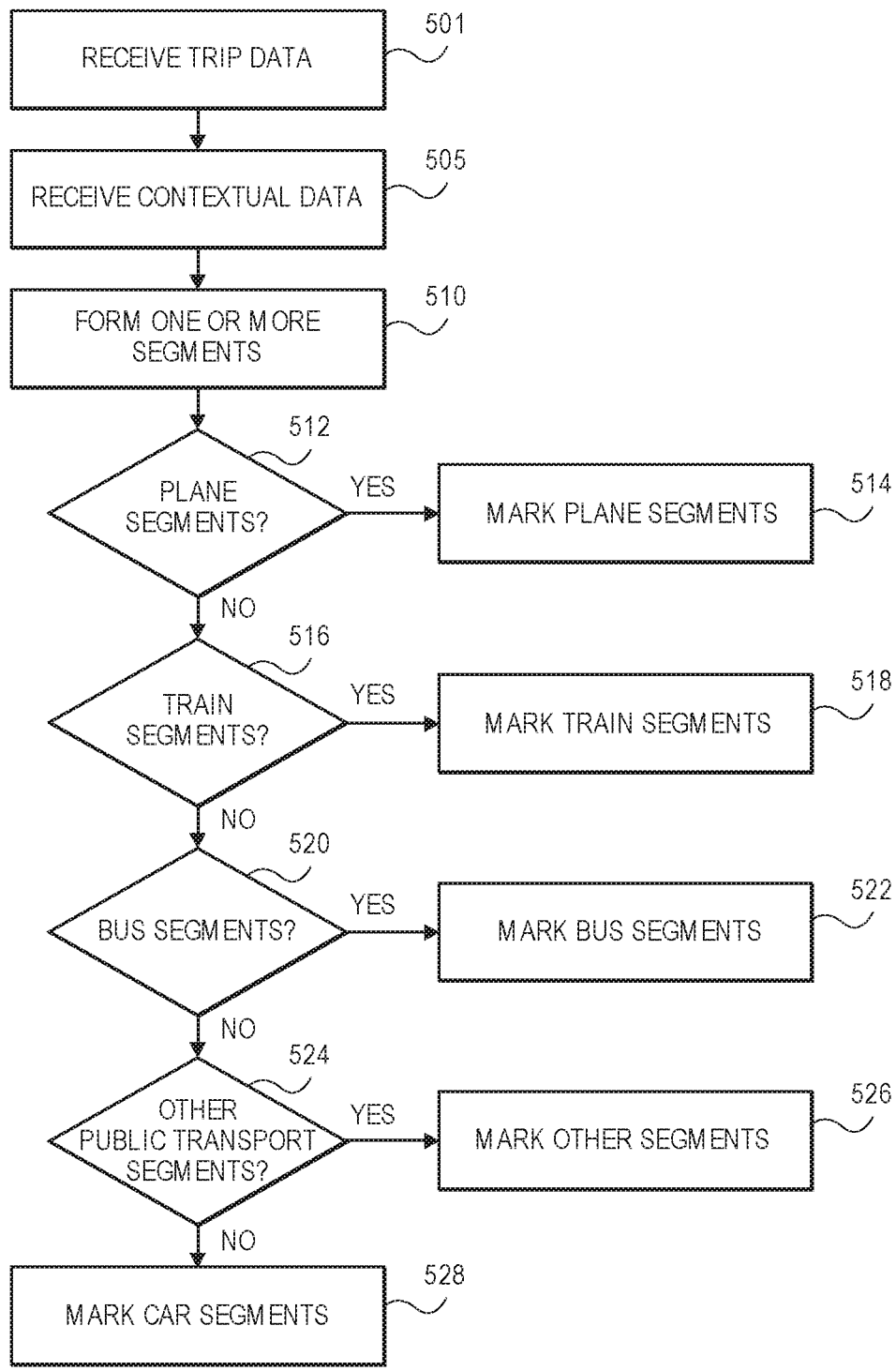
FIG. 5 is a flowchart illustrating a method of determining modes of transportation during a trip according to an embodiment of the invention.

FIG. 5 is a flowchart illustrating a method of determining modes of transportation during a trip according to an embodiment of the invention. This method may be used, for example, to determine that a user of a device is traveling by car, and not by another method. The method illustrated in FIG. 5 utilizes contextual data to remove non-driving modes of transportation from segments of the trip, resulting in the determination of driving segments during the trip. If the trip consists of solely non-driving modes, then the trip can be identified as such and not used to analyze the user's driving behaviors.

In the embodiments illustrated in FIG. 5, contextual data, also referred to as contextual map data, is utilized in determining the modes of transportation during a trip. The contextual map data can be stored in a database that includes data related to transportation systems, including roads, trains, buses, bodies of water, and the like. As an example, location data related to trains could include locations of train stations, locations of train tracks, timetables and schedules, and the like. Furthermore, location data related to a bus system could include bus routes, bus schedules, bus stops, and the like.

Referring to FIG. 5, the method includes receiving trip data at step 501 and receiving contextual data at step 505. Typically, the trip data is measured using a mobile device, such as a smart phone. The trip data can include location data (e.g., GPS data) as a function of time, accelerometer data, combinations thereof, or the like. In some embodiments, in order to prolong battery life, only certain data (e.g., location/GPS data) is utilized, whereas in other embodiments, combinations of data (e.g., the location data supplemented with accelerometer data) may be utilized. One of ordinary skill in the art would recognize many variations, modifications, and alternatives.

In an embodiment, the trip data may be analyzed to determine when stops are present in the trip data. As an example, using a mobile device, the velocity of the mobile device can be determined by analyzing the location data as a function of time. When the velocity of the mobile device drops below a threshold or is equal to zero for a predetermined period of time, a stop in the trip data can be determined. Thus, a trip can be broken down into segments based on the speed of the user. Wherever the measured speed is close to zero, the corresponding GPS point marks the beginning or end of a segment. Once the segments have been created, algorithms can be used as described below to determine the mode of transportation for the segment. In some embodiments, the segments may then grouped based on the determined mode to form stages.

Accordingly, segments can be formed by defining the segments as time periods between stops in the trip data at step 510. Accordingly, for a given trip, a number of segments can be formed, with each segment separated by a stop in the trip data. As an example, if a person using the mobile device is riding on a bus, every time the bus stops can be defined as a segment. The contextual data can be used to determine that one or more of the segments are associated with a bus and the segments can be marked as bus segments. As contiguous segments are associated with a bus, a stage can be formed by linking together contiguous segments to form a stage of the trip associated with travel on a bus. Other modes of transportation can be defined based on segments and stages as well. In some embodiments, segments and stages can be associated with differing modes of transportation, such as walking before and after a bus stage.

The method may also include determining if segments of the trip are associated with planes at step 512 and removing these segments of the trip that are associated with airplanes. Segments may be analyzed so that segments not associated with car travel (for example, starting with plane segments) are removed from the data set, leaving a data set only including car segments. Accordingly, driving data can be separated from other modes of transportation and driving behavior can be analyzed.

Returning to the classification performed at decision block 512, the contextual data received at step 505 includes locations of airports, airport runways, and the like. The location of the points in the trip are compared to the locations associated with airports, which can be represented by airport polygons. Although a taxiing plane can be characterized by speeds comparable to vehicle traffic, the location of the taxiing plane on a runway enables these points in the trip to be removed from the data set as a non-driving event. Thus, both location and vehicle speed as determined using the mobile device can be used to determine that a segment of a trip is associated with a plane. In some embodiments, the segment/stage of the trip associated with an airplane may be marked accordingly.

The segments of the trip that are associated with planes may be marked accordingly at step 514. If the trip data does not include any segments associated with a plane, then the method may proceed to determinations related to other modes of public transportation.

The method may also include determining if segments of the trip are associated with trains at step 516 and removing segments of the trip associated with trains. According to embodiments of the present invention, the category of trains can include various rail-based transportation systems, including commuter trains, light rail, subways, elevated-track trains, and the like. Accordingly, the use of the term "train" should be understood to include these rail-based transportation systems.

Data about the trip may be used in conjunction with contextual data to determine segments of the trip that are associated with train travel and segments that are not associated with train travel. Although a train can move at speeds comparable to vehicle traffic, the location of the train tracks enables these points in the trip to be removed from the data set as a non-driving event. In the embodiment illustrated in FIG. 5, the segments/stages of the trip associated with a train may be marked accordingly at step 518. If the trip data does not include any segments associated with a train, then the method proceeds to determinations related to other modes of public transportation.

At decision block 520, it may be determined if segments of the trip are associated with a bus, and if so, these segments of the trip are removed at step 522. Segments associated with a bus can be identified, for example, by using contextual data such as bus routes, and correlating the travel path or stopping pattern to the bus route. At decision block 524, it is determined if segments of the trip are associated with any other modes of public transportation such as, for example, a ferry. If so, these segments are removed at step 526. The remaining segments are marked as car segments at step 528. This method is more fully described in U.S. patent application Ser. No. 15/149,628, filed May 9, 2016, entitled "MOTION DETECTION SYSTEM FOR TRANSPORTATION MODE ANALYSIS", herein incorporated by reference in its entirety.

Figure 6:
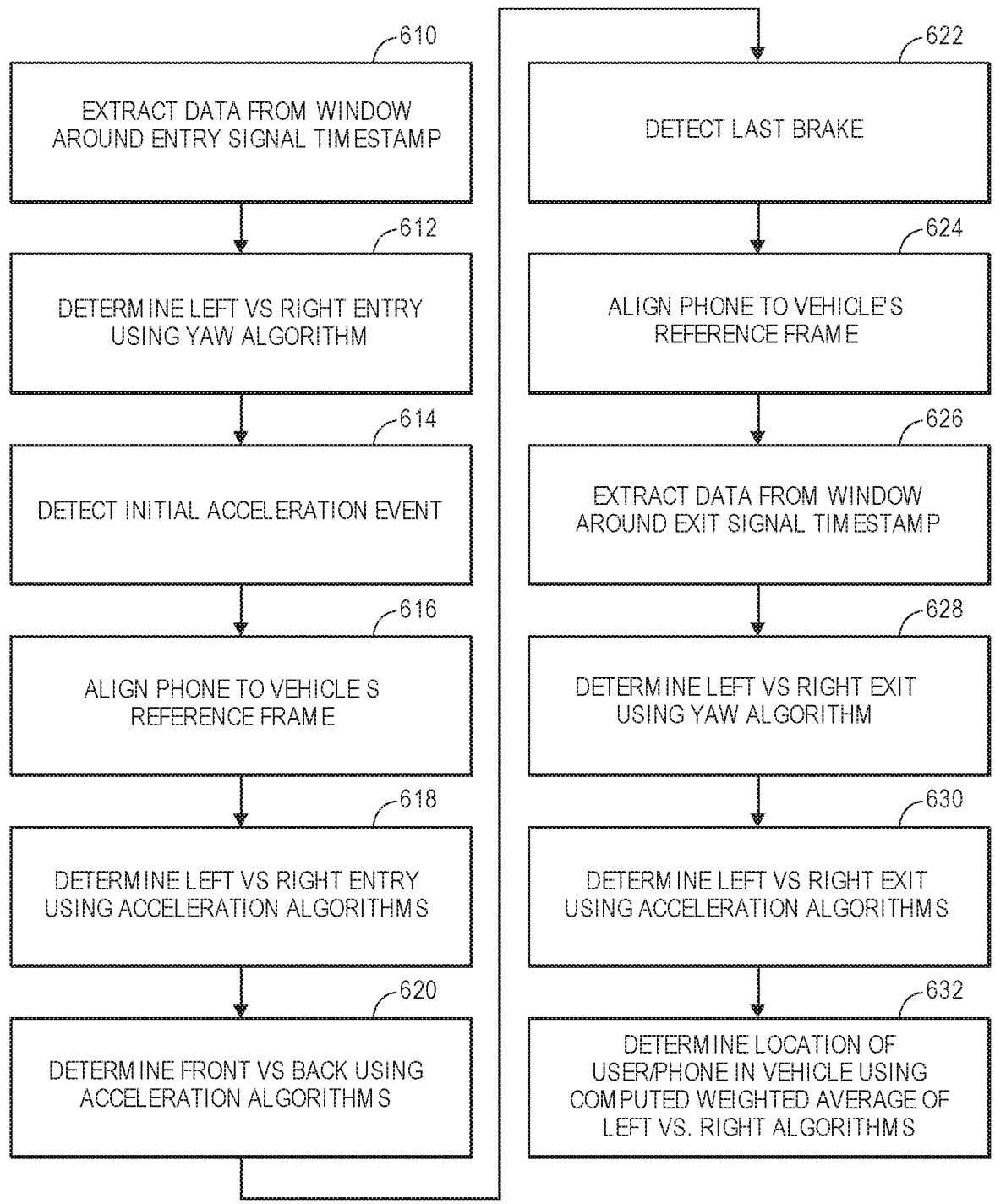
FIG. 6 is a flowchart illustrating a method of determining a location of a user and device in a vehicle according to an embodiment of the invention.

FIG. 6 is a flowchart illustrating a method of determining a location of a mobile device in a vehicle according to an embodiment of the invention, in order to determine whether the user is driving the vehicle. The method illustrated in FIG. 6 provides a direct method of determining where a user and/or a user's mobile device is located in a vehicle and if the user is driving the vehicle during a driving event. The method includes extracting data from the window around the entry signal time stamp at step 610. It should be noted that the methods described in relation to FIG. 6 utilize information related to the entry of the user into the vehicle as described herein. When an individual enters and exits a vehicle, their body turns at least some minimum angle threshold (e.g., 40 degrees) about the z-axis (the z axis, is aligned with gravity, and the yaw is defined as the angular distance in a counter-clockwise direction around the z-axis). After merging the windows form the last walking and first driving classification, this merged window may be analyzed for the exact time when a user turns about the z axis at least some minimum threshold angle. This allows us to narrow down the window to the exact point of entry.

In order to determine if the user entered the vehicle from the left or right, several algorithms can be used in conjunction with each other or separately. As an example, after identifying a precise time window of when the user has entered the vehicle, the user is identified as being on the left or the right side of the vehicle. This is determined using one, multiple, or all of the methods described below.

As illustrated in FIG. 6, the method may run a left vs. right enter yaw algorithm to determine if the driver entered from the left or the right side of the vehicle at step 612. As driving begins, the method may detect an initial (e.g., the first) acceleration event at step 614. Although a first acceleration event is detected in some embodiments, other implementations will utilize an acceleration event early in the driving event, although not the first acceleration event.

Given the detection of the initial acceleration event, the method may also include aligning the phone to the vehicle's (e.g., a car's) reference frame at step 616. Given the alignment of the phone to the reference frame of the vehicle, the method can utilize an acceleration-based algorithm to determine if the driver entered on the left or right side of the vehicle at step 618.

The method further includes determining if the user is in the front or back of the vehicle at step 620. One of multiple methods may be utilized to determine if the user is in the front or back of the vehicle.

Referring once again to FIG. 6, the method may include determining the user's exit from the vehicle. This may include detecting a terminal acceleration (i.e., a braking event) near or at the end of the driving event at step 622. In some implementations, the last braking event in the driving event is determined. Referring to FIG. 4, as the driving event ends, a window can be created around the user's exit from the vehicle, with the window based on or including the end of the driving classification and the first walking classification after the driving event. The last braking event will be in this window.

After driving of the vehicle, the alignment between the phone and the vehicle's reference frame can change. Accordingly the phone is aligned to the vehicle's reference frame after the last braking event is detected at step 624 and data is extracted from the window around the exit signal timestamp at step 626.

In order to determine which side of the vehicle a user exited or was located during the driving event, one or more left vs. right exit algorithms can be utilized at step 630, including a yaw-based algorithm. In some embodiments, a weighted average of the left vs. right algorithms is computed, which is then used to determine the left vs. right and front vs. back location of the user/phone in the vehicle at step 632.

It should be appreciated that the specific steps illustrated in FIG. 6 provide a particular method of determining a location of a driver in a vehicle according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Further disclosure with respect to driver identification can be found in U.S. patent application Ser. No. 14/139,510, filed Dec. 23, 2013, now U.S. Pat. No. 9,398,423, issued Jul. 19, 2016, entitled "METHODS AND SYSTEMS FOR DRIVER IDENTIFICATION", herein incorporated by reference in its entirety.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
   identifying a user of a mobile device as a driver of a vehicle;
   receiving motion data from at least one sensor of the mobile device;
   correlating movement of the mobile device to a first driving trip in the vehicle based on the received motion data;
   monitoring manipulation of the mobile device by the user in the vehicle using the at least one sensor of the mobile device;
   computing a first overall driver score based on the user of the mobile device and a first driving score associated with the first driving trip, wherein the first driving score is computed using at least one driving event associated with a positive or negative behavior;
   providing a behavior notification to the user of the mobile device, wherein providing the behavior notification comprises:
      providing a first sensory alert that indicates a positive feedback responsive to determining that the first overall driver score is greater than a threshold; and
      providing a second sensory alert that indicates a negative feedback responsive to determining that the first overall driver score is less than the threshold;
   computing a second overall driver score based on the user of the mobile device and a second driving score associated with a subsequent trip; and
   adjusting a subsequent behavior notification based on a comparison of the first overall driver score and the second overall driver score.

2. The method of claim 1, wherein the behavior notification further comprises at least one of an audio alert, a push notification, a haptic alert, or in-application feedback.

3. The method of claim 1, further comprising notifying the user of the at least one driving event during the first driving trip in the vehicle.

4. The method of claim 1, wherein the manipulation of the mobile device comprises at least one of a motion behavior or a state of use behavior.

5. The method of claim 4, wherein the motion behavior comprises at least one of speed, acceleration, location, or orientation.

6. The method of claim 4, wherein the state of use behavior comprises at least one of type of use, time of use, or whether the mobile device is being actively used during the first driving trip in the vehicle.

7. The method of claim 1, wherein the at least one driving event comprises at least one of a braking event, a speeding event, a distracted driving event, a non-braking event, a non-speeding event, or a non-distracted driving event.

8. The method of claim 1, wherein identifying the user of the mobile device as the driver of the vehicle comprises utilizing the motion data.

9. A mobile device comprising:
   a memory;
   a motion data unit; and
   a processor coupled to the memory, wherein the processor is configured to perform operations including:
      identifying a user of the mobile device as a driver of a vehicle;
      receiving motion data from the motion data unit of the mobile device;
      correlating movement of the mobile device to a first driving trip in the vehicle based on the received motion data;
      monitoring manipulation of the mobile device by the user in the vehicle using the motion data unit of the mobile device;
      computing a first overall driver score based on the user of the mobile device and a first driving score associated with the first driving trip, wherein the first driving score is computed using at least one driving event associated with a positive or negative behavior;
      providing a behavior notification to the user of the mobile device, wherein providing the behavior notification comprises:
         providing a first sensory alert that indicates a positive feedback responsive to determining that the first overall driver score is greater than a threshold; and
         providing a second sensory alert that indicates a negative feedback responsive to determining that the first overall driver score is less than the threshold;
      computing a second overall driver score based on the user of the mobile device and a second driving score associated with a subsequent trip; and
      adjusting a subsequent behavior notification based on a comparison of the first overall driver score and the second overall driver score.

10. The mobile device of claim 9, wherein the behavior notification further comprises at least one of an audio alert, a push notification, a haptic alert, or in-application feedback.

11. The mobile device of claim 9, further comprising notifying the user of the at least one driving event during the first driving trip in the vehicle.

12. The mobile device of claim 9, wherein the manipulation of the mobile device comprises at least one of a motion behavior or a state of use behavior.

13. The mobile device of claim 12, wherein the state of use behavior comprises at least one of type of use, time of use, or whether the mobile device is being actively used during the first driving trip in the vehicle.

14. The mobile device of claim 9, wherein the at least one driving event comprises at least one of a braking event, a speeding event, a distracted driving event, a non-braking event, a non-speeding event, or a non-distracted driving event.

15. The mobile device of claim 9, wherein identifying the user of the mobile device as the driver of the vehicle comprises utilizing the motion data.

* * * * *